(12) United States Patent
Takeuchi

(10) Patent No.: US 7,873,783 B2
(45) Date of Patent: Jan. 18, 2011

(54) COMPUTER AND METHOD FOR REFLECTING PATH REDUNDANCY CONFIGURATION OF FIRST COMPUTER SYSTEM IN SECOND COMPUTER SYSTEM

(75) Inventor: Shinya Takeuchi, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 521 days.

(21) Appl. No.: 12/025,232

(22) Filed: Feb. 4, 2008

(65) Prior Publication Data

US 2009/0125679 A1     May 14, 2009

(30) Foreign Application Priority Data

Nov. 13, 2007   (JP)  ............... 2007-294925

(51) Int. Cl.
| | |
|---|---|
| G06F 12/00 | (2006.01) |
| G06F 13/00 | (2006.01) |
| G06F 13/28 | (2006.01) |
| G06F 3/00 | (2006.01) |
| G06F 5/00 | (2006.01) |
| G06F 11/00 | (2006.01) |

(52) U.S. Cl. .................. 711/114; 711/154; 711/161; 711/162; 710/36; 710/38; 714/43

(58) Field of Classification Search ............. 711/114, 711/154, 161–162; 710/36, 38; 714/43
See application file for complete search history.

(56) References Cited

U.S. PATENT DOCUMENTS 7,290,168 B1*  10/2007  DeKoning ............... 714/9
7,590,811 B1*   9/2009  Contreras ............... 711/162
2005/0097243 A1*  5/2005  Yamashita et al. ........ 710/38
2007/0055737 A1*  3/2007  Yamashita et al. ........ 709/213
2007/0055797 A1*  3/2007  Shimozono ............. 710/36
2007/0294562 A1*  12/2007  Takamatsu et al. ........ 714/4
2008/0301332 A1*  12/2008  Butler et al. ........... 710/38
2008/0301333 A1*  12/2008  Butler et al. ........... 710/38

FOREIGN PATENT DOCUMENTS

JP       2006-301891       11/2006

* cited by examiner

*Primary Examiner*—Yaima Campos
(74) *Attorney, Agent, or Firm*—Antonelli, Terry, Stout & Kraus, LLP.

(57) ABSTRACT

Mapping management information denoting the mapping of a first host and first host volume and a second host and second host volume is prepared beforehand. First-path-redundancy information, which is related to the redundancy of a first path of the first host volume, is acquired, and a second host volume and second host mapped to this first host volume and the first host thereof are specified by referencing the mapping management information. The redundancy of a second path, which links the specified second host volume and a second storage volume, is decided based on the first-path-redundancy information. Second-path-redundancy information, which is related to the decided second-path redundancy, is outputted to configure the decided second-path redundancy in the above-mentioned specified second host.

12 Claims, 16 Drawing Sheets

PATH STATUS TABLE 209S

| HOST VOL IDENTIFIER | ON-NUMBER | OFF-NUMBER |
|---|---|---|
| HV01 | 2 | 2 |
| HV02 | 2 | 2 |
| HV03 | 4 | 0 |

CHA/VOL TABLE 231S

| CHA IDENTIFIER | STORAGE VOL |
|---|---|
| CHA1 | SV#01,SV#02 |
| CHA2 | SV#02,SV#03 |
| ⋮ | ⋮ |

LUN SECURITY TABLE 233S

| CHA IDENTIFIER | CHA PORT IDENTIFIER | LUN SECURITY INFORMATION |
|---|---|---|
| CHA1 | SP#01 | 1234567 |
|  | SP#02 | 7890123 |
| ⋮ | ⋮ | ⋮ |

FIG. 6A

HOST VOLUME MAPPING MANAGEMENT TABLE 411A

| COPY-SOURCE HOST IDENTIFIER | COPY-SOURCE HOST VOL IDENTIFIER | NO. OF COPY-SOURCE PATHS | COPY-TARGET HOST IDENTIFIER | COPY-TARGET HOST VOL IDENTIFIER | NO. OF COPY-TARGET PATHS |
|---|---|---|---|---|---|
| Host01 | HV01 | 4 | Host11 | HV11 | 4 |
|  | HV02 | 4 |  | HV12 | 8 |
|  | HV03 | 4 |  | HV13 | 2 |
| Host02 | ... | ... | Host12 | ... | ... |
| : | : | : | : | : | : |

FIG. 6B

PATH STATUS MANAGEMENT TABLE 415

| COPY-SOURCE HOST IDENTIFIER | COPY-SOURCE HOST VOL IDENTIFIER | ON-NUMBER | OFF-NUMBER | COPY-TARGET HOST IDENTIFIER | COPY-TARGET HOST VOL IDENTIFIER | ON-NUMBER | OFF-NUMBER |
|---|---|---|---|---|---|---|---|
| Host01 | HV01 | 1 | 3 | Host11 | HV11 | 1 | 3 |
|  | HV02 | 2 | 2 |  | HV12 | 2 | 2 |
|  | HV03 | 3 | 2 |  | HV13 | 3 | 1 |
| Host02 | ... | ... |  | Host12 | ... | ... |  |
| : | : | : |  | : | : | : |  |

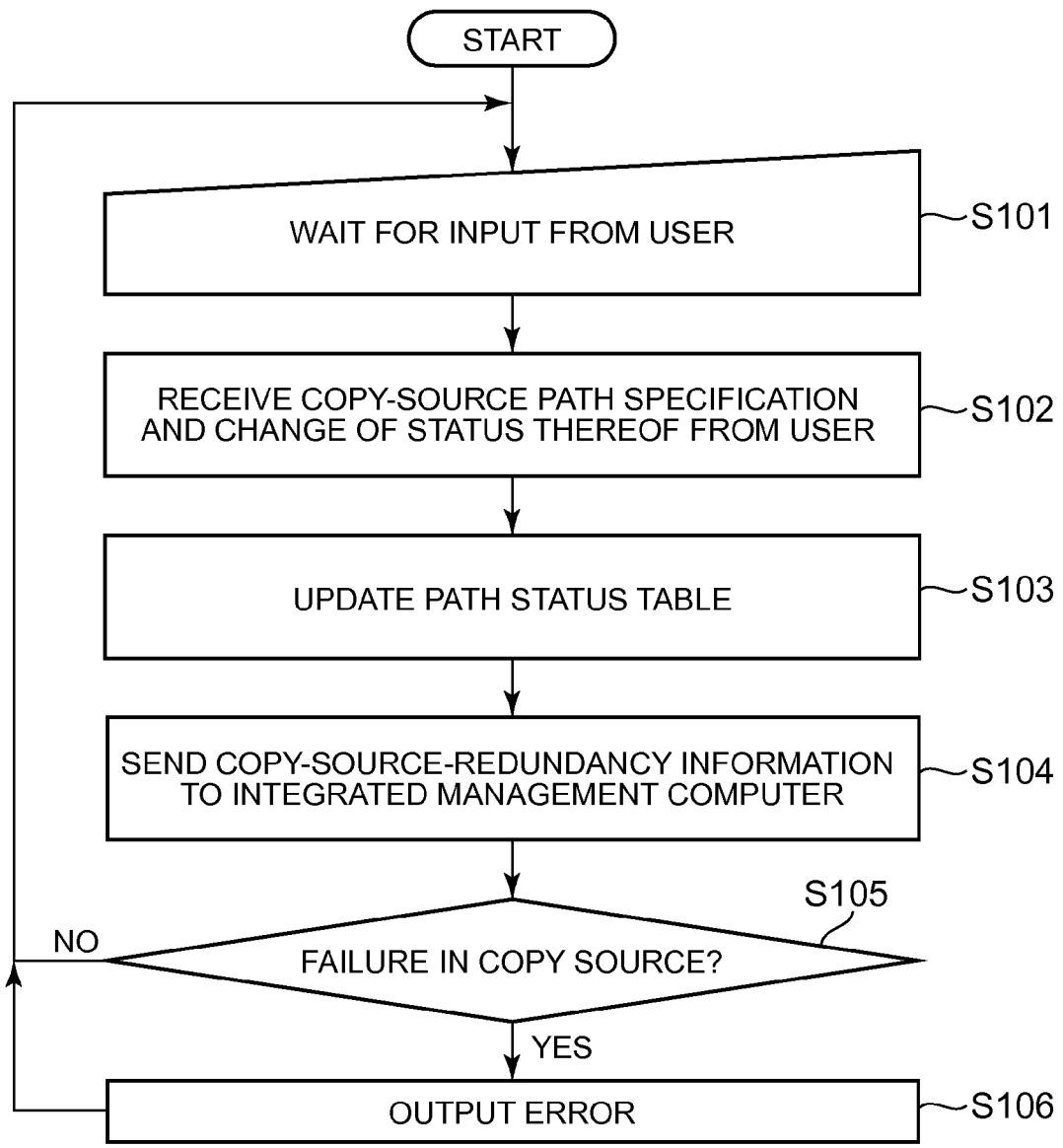

FIG. 16A

HBA PORT MAPPING MANAGEMENT TABLE 411B

| COPY-SOURCE HOST IDENTIFIER | COPY-SOURCE HBA PORT IDENTIFIER | COPY-TARGET HOST IDENTIFIER | COPY-TARGET HBA PORT IDENTIFIER |
|---|---|---|---|
| Host01 | HP01 | Host11 | HP11 |
|  | HP02 |  | HP12 |
|  | HP03 |  | HP13 |
| Host02 | ... | Host12 | ... |
| : | : | : | : |

FIG. 16B

CHA PORT MAPPING MANAGEMENT TABLE 411C

| COPY-SOURCE STORAGE SYSTEM IDENTIFIER | COPY-SOURCE CHA PORT IDENTIFIER | COPY-TARGET STORAGE SYSTEM IDENTIFIER | COPY-TARGET CHA PORT IDENTIFIER |
|---|---|---|---|
| Storage01 | SP01 | Storage11 | SP11 |
|  | SP02 |  | SP12 |
|  | SP03 |  | SP13 |
| Storage02 | ... | Storage12 | ... |
| : | : | : | : |

COMPUTER AND METHOD FOR REFLECTING PATH REDUNDANCY CONFIGURATION OF FIRST COMPUTER SYSTEM IN SECOND COMPUTER SYSTEM

CROSS-REFERENCE TO PRIOR APPLICATION

This application relates to and claims the benefit of priority from Japanese Patent Application number 2007-294925, filed on Nov. 13, 2007, the entire disclosure of which is incorporated herein by reference.

BACKGROUND

The present invention generally relates to the management of information related to a computer system constituting one or more hosts and storage systems.

The so-called remote copy technique by which data stored in a first storage system is copied to a second storage system is known (Japanese Patent Laid-open No. 2006-301891, hereinafter referred to as Patent Document 1). For example, even if a disaster or the like makes it impossible to acquire data from the first storage system, a job can be continued by using the data stored in the second storage system.

A first computer system can be constructed using the first storage system, and one or more first hosts connected thereto. The first host has a first host volume. The first host volume is a logical device mapped to a first storage volume that the first host recognizes. The first storage volume is a logical volume of the first storage system. A plurality of first paths can be established between the first host volume and the first storage volume. The first host can manage pluralities of first paths established between respective first host volumes and respective first storage volumes.

Similarly, a second computer system can be constructed using the second storage system, and one or more second hosts connected thereto. The second host has a second host volume. The second host volume is a logical device mapped to a second storage volume that the second host recognizes. The second storage volume is a logical volume of the second storage system. A plurality of second paths can be established between the second host volume and the second storage volume. The second host can manage pluralities of second paths established between respective second host volumes and respective second storage volumes.

While carrying out operations using the first host, it is possible to logically connect and disconnect a desired path of the plurality of first paths connected to the same first storage volume by switching the state of the desired path back and forth between active and passive. In other words, the redundancy of the first path can be configured for the first storage volume. The configuration of the redundancy of the first path is carried out manually.

When the base of operations switches from the first computer system to the second computer system due to a disaster or the like, it is desirable that the same redundancy as the redundancy of the first path, which was optimized in accordance with the operation of the first computer system, be configured in the second computer system as well.

However, configuring path redundancy manually is extremely burdensome. For example, when the second computer system comprises anywhere from several tens of units to several hundreds of units of the second hosts, the total number of paths to be configured can number several thousand, and configuring, for the respective second storage volumes, the same path redundancy as the redundancy of the first path, which is connected to the first storage volume that configures a volume pair, is an enormous burden.

SUMMARY

Therefore, an object of the present invention is to reflect the path redundancy configured in the first computer system in the second computer system without placing much of a burden on the individuals involved.

The other objects of the present invention should become clear from the following explanations.

Mapping management information denoting the correspondence between a first host and a first host volume, and a second host and a second host volume, is prepared beforehand. First-path-redundancy information related to the redundancy of the first path for the first host volume is acquired, and the second host volume and second host mapped to this first host volume and the first host thereof are specified by referencing the mapping management information. The redundancy of the second path, which links the specified second host volume to the second storage system, is decided based on first-path-redundancy information. Second-path-redundancy information related to the redundancy of the decided second path is outputted for configuring the redundancy of the decided second path in the above-mentioned specified second host.

BRIEF DESCRIPTION OF THE DRAWINGS

FIG. 6A shows an example of the configuration of a host volume mapping management table;

FIG. 6B shows an example of the configuration of a path status mapping management table;

FIG. 7 shows an example of the flow of processing carried out by copy-source multi-path management software;

FIG. 16A shows an example of the configuration of a HBA port mapping management table; and FIG. 16B shows an example of the configuration of a CHA port mapping management table.

DETAILED DESCRIPTION OF THE PREFERRED EMBODIMENT

Figure 1:
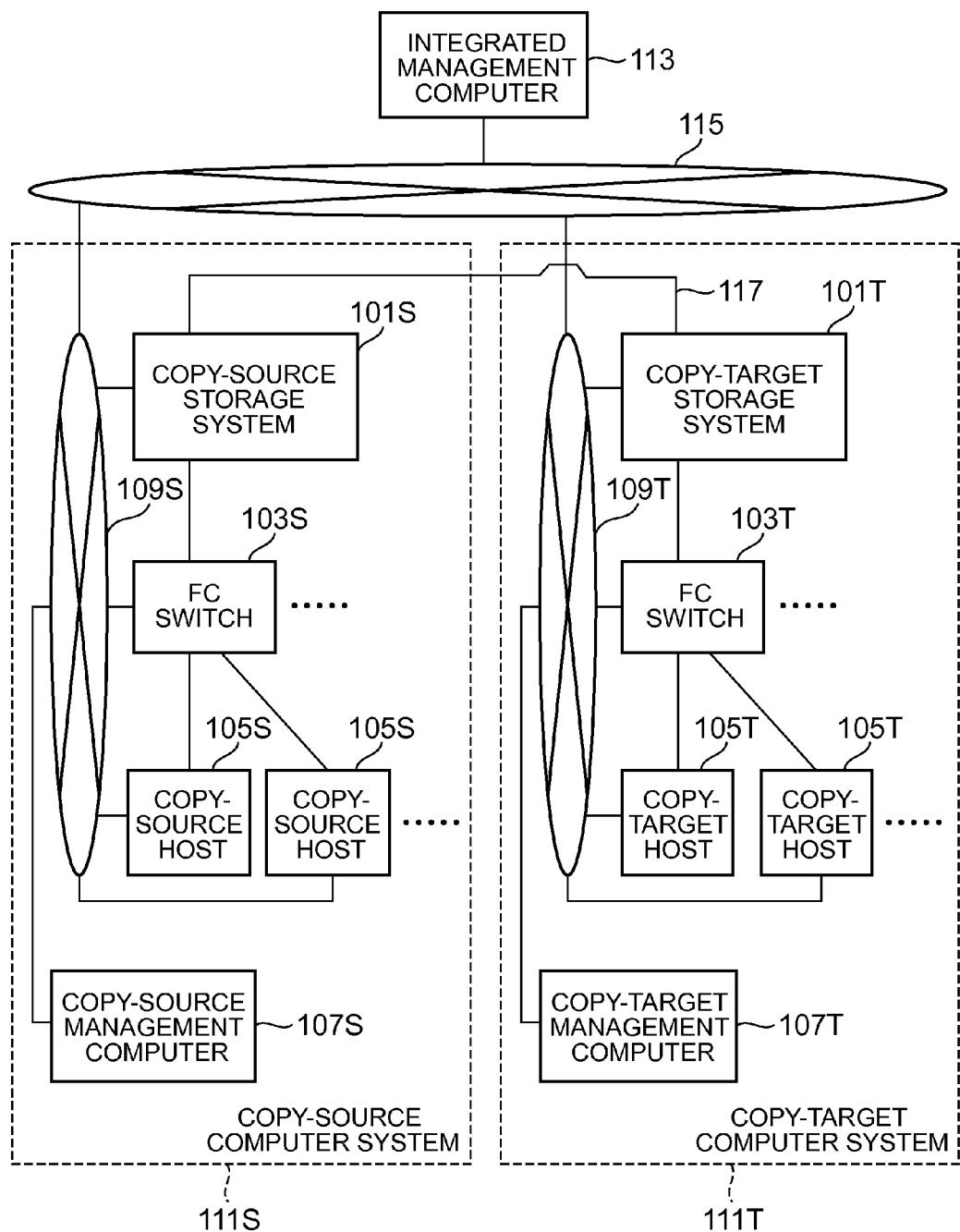
FIG. 1 is a diagram showing an example of the overall constitution of a system related to a first embodiment of the present invention.

In Embodiment 1, the computer comprises a first-path-redundancy acquisition unit; a redundancy-configuration-destination specification unit; a second-path-redundancy decision unit; and an output unit. The first-path-redundancy acquisition unit acquires first-path-redundancy information. First-path-redundancy information is information related to the redundancy of the first path, which links the first storage volume of the first storage system to the first host volume of the first host. The redundancy-configuration-destination specification unit references the host volume mapping management information (information denoting which first host volume of which first host is mapped to which second host volume of which second host), and specifies the second host volume mapped to the first host volume connected to the first path for which redundancy has been configured. The second-path-redundancy decision unit decides the redundancy of the second path, which links the above-mentioned specified second host volume to the second storage volume of the second storage system, based on the above-mentioned acquired first-path-redundancy information. The output unit second-path-redundancy information, which is information related to the redundancy of the above-mentioned decided second path, so that the above-mentioned decided second-path redundancy is configured in the second host having the above-mentioned specified second host volume.

The first-path redundancy is a value based on the number of active first paths, which are the active-state first paths of the plurality of first paths which connect to the same first host volume and the same first storage volume. The first-path-redundancy information, for example, can be information on how many active first paths have been added or dropped.

The second-path redundancy is a value based on the number of active second paths, which are the active-state second paths of the plurality of second paths, which connect to the same second host volume and the same second storage volume.

The above-mentioned first storage system and one or more first hosts constitute a first computer system. The above-mentioned first storage volume is a logical volume in the above-mentioned first storage system. The above-mentioned first host volume is a logical device mapped to the above-mentioned first storage volume recognized by the above-mentioned first host.

The above-mentioned second storage system and one or more second hosts constitute a second computer system. The above-mentioned second storage volume is a logical volume, which is in the above-mentioned second storage system, and which stores data that is stored in the above-mentioned first storage volume. The above-mentioned second host volume is a logical device mapped to the above-mentioned second storage volume recognized by the above-mentioned second host.

In Embodiment 2 according to Embodiment 1, when the number of first paths for which redundancy has been configured and the number of second paths mapped to the redundancy-configured first paths are the same, the above-mentioned second-path-redundancy decision unit decides a redundancy for the above-mentioned mapped second path that is the same redundancy as the first-path redundancy.

In Embodiment 3 according to either Embodiment 1 or 2, when the number of first paths for which redundancy has been configured $P_s$ and the number of second paths mapped to the redundancy-configured first paths $P_t$ are different, the above-mentioned second-path-redundancy decision unit decides the redundancy for the above-mentioned mapped second path such that the percentage of the number of active second paths for the above-mentioned $P_t$ is as close as possible to the percentage of the number of active first paths for the above-mentioned $P_s$.

In Embodiment 4 according to either Embodiment 1 or 2, when the number of first paths for which redundancy has been configured $P_s$ and the number of second paths mapped to the redundancy-configured first paths $P_t$ are different, the above-mentioned second-path-redundancy decision unit decides the redundancy of the above-mentioned mapped second path based on the configured redundancy of the number of either active or passive first paths.

In Embodiment 5 according to any of Embodiments 1 through 4, when $P_s < P_t$ due to an error having occurred in any of the first paths, the above-mentioned second-path-redundancy decision unit decides the redundancy of the above-mentioned mapped second path such that the number of second paths in the passive state equals the number of failed first paths, which are first paths in which errors have occurred.

In Embodiment 6 according to any of Embodiments 1 through 5, when $P_s > P_t$ due to an error having occurred in any of the second paths, the above-mentioned second-path-redundancy decision unit decides the redundancy of the above-mentioned mapped second path such that the number of passive second paths, which are second paths in the passive state, is as close as possible to the number of passive first paths, which are first paths in the passive state, by allocating an active first path for an error second path, which is a second path in which an error has occurred.

In Embodiment 7 according to any of Embodiments 1 through 6, the above-mentioned output unit writes the above-mentioned second-path-redundancy information to the first storage volume mapped to the first host volume to which the redundancy-configured first paths are connected.

In Embodiment 8 according to any of Embodiments 1 through 7, the above-mentioned first storage system has a plurality of first storage ports and a first access controller. The above-mentioned first storage port is a communication port for receiving an access command from the first host. The above-mentioned first access controller is a first storage port to which has been mapped a first identification information mapped to a first host port, which is either the first host or a communication port thereof, and when an access command is received, the above-mentioned first access controller allows access to this access command if this access command is from either the first host or the first host port that is mapped to the above-mentioned first identification information. The above-mentioned second storage system has a plurality of second storage ports, and a second access controller. The above mentioned second storage port is a communication port for receiving an access command from the second host. The above-mentioned second access controller is a second storage port to which has been mapped a second identification information mapped to a second host port, which is either the second host or a communication port thereof, and when an access command is received, the above-mentioned second access controller allows access to this access command if this access command is from either the second host or the second host port that is mapped to the above-mentioned second identification information. The above-mentioned computer comprises a first-security-information acquisition unit; an identification information/storage port specification unit; and a second-security-information output unit. The first-security-information acquisition unit acquires first security information, which is information related to what first identification information is mapped to which first storage port. The identification information/storage port specification unit references identification mapping management information, which is information denoting which first identification information is mapped to which second identification information, and storage port mapping management information, which is information denoting which first storage port is mapped to which second storage port, and specifies the second identification information mapped to the first identification information specified from the above-mentioned first security information, and the second storage port mapped to the first storage port specified from the above-mentioned first security information. The second-security-information output unit outputs second security information, which is information related to the specified second storage port and the specified second identification information, such that the above-mentioned specified second identification information is mapped to the above-mentioned specified second storage port.

In Embodiment 9 according to Embodiment 8, the above-mentioned first security information is information related to which first identification information mapped to which first storage port will change to what first identification information. The above-mentioned identification information/storage port specification unit specifies the pre-change second identification information mapped to the pre-change first identification information specified from the above-mentioned first security information, and the post-change second identification information mapped to the post-change first identification information specified from the above-mentioned first security information. The above-mentioned second security information comprises the specified pre-change second identification information and post-change second identification information.

In Embodiment 10 according to either of Embodiments 8 or 9, the above-mentioned acquired first-path-redundancy information is information related to the post-change redundancy of the first path through the first storage port, which was changed as a result of the first identification information being mapped to the first storage port.

At least one of the above-described first-path-redundancy acquisition unit, redundancy-configuration-destination specification unit, second-path-redundancy decision unit, output unit, first-security-information acquisition unit, identification information/storage port specification unit, or second-security-information output unit can be constructed using either hardware, a computer program or a combination thereof (for example, one part can be realized via a computer program, and the remainder can be realized via hardware). The computer program is executed by being read into a prescribed processor. Further, a storage region that resides in a hardware resource, such as a memory, can be used as needed when information processing is carried out by reading the computer program into the processor. Further, the computer program can be installed in the computer from a CD-ROM or other such recording medium, or downloaded to the computer via a communication network.

An embodiment of the present invention will be explained in detail below while referring to the figures. To make the explanation easier to understand at this time, computer program may be used as the subject instead of CPU when explaining a process carried out by the CPU reading in and executing the computer program.

FIG. 1 is a diagram showing an example of the overall constitution of a system related to the first embodiment of the present invention.

There is a copy-source computer system 111S and a copy-target computer system 111T. The copy-source computer system 111S is the system constituting the data copy source, for example, the system currently in use. Conversely, the copy-target computer system 111T is the system constituting the data copy target, for example, the system that is standing by. When the copy-source computer system 111S goes down as the result of a disaster or the like, the copy-target computer system 111T switches from the standby system to the current-use system, and operation continues. Furthermore, the copy-target computer system 111T can also be the current-use system.

In FIG. 1, the symbol "S" is appended at the end of the reference numerals of the components residing in the copy-source computer system 111S. Conversely, the symbol "T" is appended at the end of the reference numerals of the components residing in the copy-target computer system 111T. For example, in copy-source computer system 111S, for example, a copy-source storage system 101S and one or more copy-source hosts 105S are connected to an FC (Fibre Channel) network configured by one or more FC switches 103S, and the copy-source storage system 101S, FC switch 103S, copy-source host 105S, and a copy-source management computer 107S are connected to a IP (Internet Protocol) network 109S. Similarly, in the copy-target computer system 111T, for example, a copy-target storage system 101T and one or more copy-target hosts 105T are connected via an FC cable, for example, to an FC (Fibre Channel) network configured from one or more FC switches 103T, and the copy-target storage system 101T, FC switch 103T, copy-target host 105T, and a copy-target management computer 107T are connected to a IP (Internet Protocol) network 109T.

The copy-source storage system 101S is the storage system that becomes the data copy source in a remote copy, and the copy-target storage system 101T is the storage system that becomes the data copy target in a remote copy. These storage systems 101S & 101T are connected by a leased line (for example, a FC (Fibre Channel) cable) 117. Data transceived at the time of a remote copy goes by way of the leased line 117. A data remote copy can also be carried out from the copy-source storage system 101S to the copy-target storage system 101T by way of an FC network or other such communication network instead of the leased line 117. Further, at least one of the copy-source storage system 101S or copy-target storage system 101T can be a plurality of storage systems.

There is an IP network 115 to which the IP network 109S inside the copy-source computer system 111S and the IP network 109T inside the copy-target computer system 111T are connected, and an integrated management computer 113 is connected to this IP network 115. The integrated management computer 113 can be connected so-called out-of-band like this, or can be connected so-called in-band (For example, the integrated management computer 113 can also be connected to the FC switch 103S and FC switch 103T).

The respective configurations of the copy-source computer system 111S and the copy-target computer system 111T are substantially the same. Hereinafter, the copy-source computer system 111S will be taken as a representative example, and the paths established between the host and storage system, and the respective components of the computer system will be explained.

Figure 2:
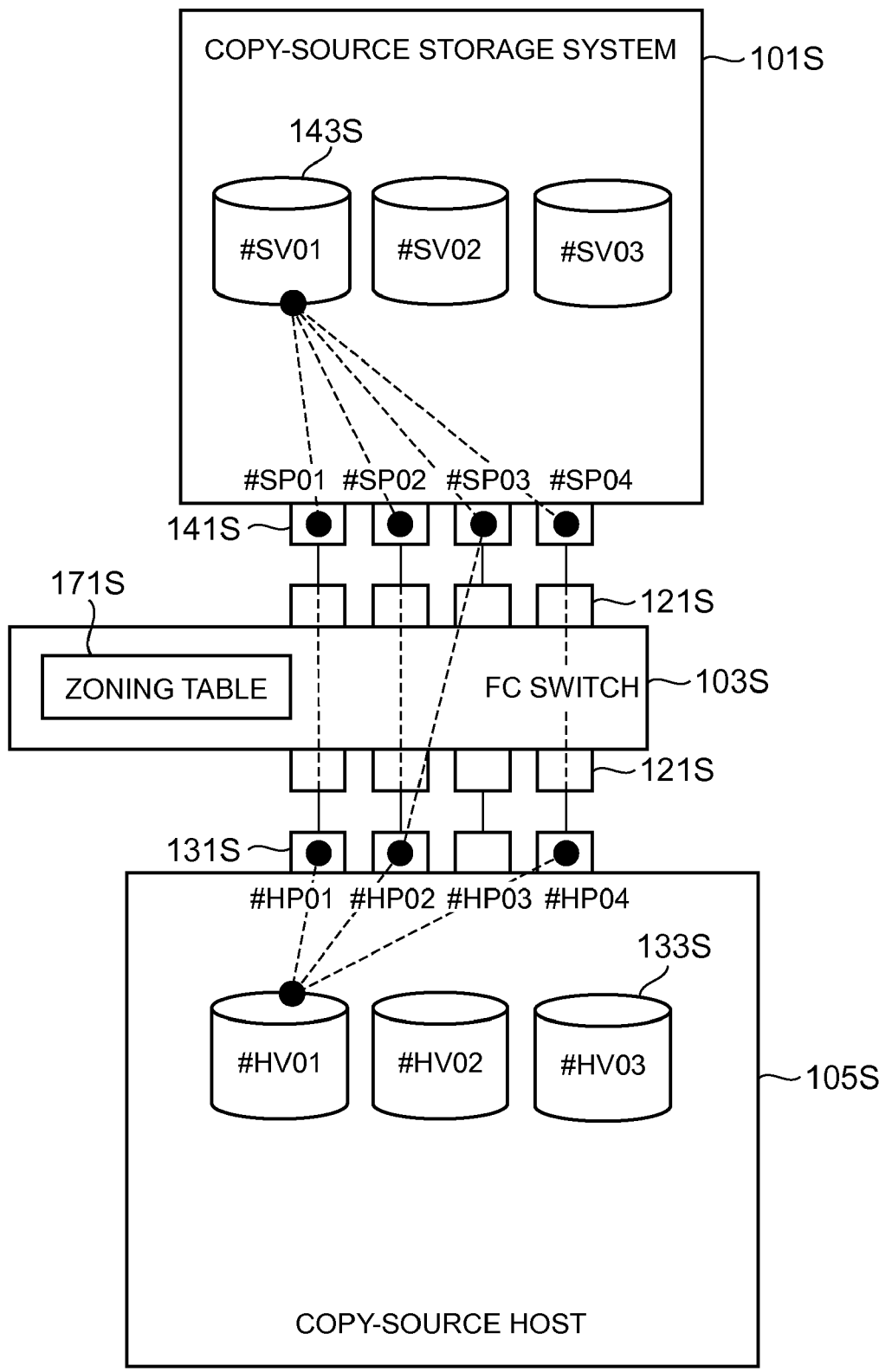
FIG. 2 is a schematic diagram of paths established between a copy-source storage system and a copy-source host.

FIG. 2 is a schematic diagram of paths established between copy-source storage system 101S and copy-source host 105S.

The copy-source storage system 101S has a copy-source storage volume 143S, and the copy-source host 105S has a copy-source host volume 133S. The copy-source host volume 133S is a logical device (for example, a device file), which is mapped to the copy-source storage volume 143S recognized by the copy-source host 105S. A "recognized copy-source storage volume 143S", for example, is a logical volume mapped to reply information in response to an inquiry command or other such prescribed query command.

The copy-source storage system 101S has a plurality of CHA ports 141S, and the copy-source host 105S has one or a plurality of HBA ports 131S. The CHA port 141S is the communication port of a channel adapter (CHA), which will be explained hereinbelow. The HBA port 131S is the communication port of the host bus adapter (HBA) comprised in the copy-source host 105S. The respective CHA ports 141S and respective HBA ports 131S are physically connected (for example, via cable) to the respective communication ports (switching ports) 121S of the FC switch 103S. A WWN (World Wide Name), which is a unique identifier of a communication port, is configured in each CHA port 141S and HBA port 131S.

A plurality of paths are established between the copy-source host volume 133S and the copy-source storage volume 143S. Hereinafter, a path existing in the copy-source computer system 111S may be called a "copy-source path", and similarly, a path existing in the copy-target computer system 111T may be called a "copy-target path". Further, the redundancy of the copy-source path may be called the "copy-source redundancy", and the redundancy of the copy-target path may be called the "copy-target redundancy". Incidentally, what is referred to as a "path" in this embodiment is not a physical path, such as a cable that links communication ports, but rather a logical path configured by a plurality of information elements, such as the identifier of a storage volume (for example, a LUN (Logical Unit Number)) and the identifier of a CHA port (for example, a port number).

According to the four dotted lines shown in FIG. 2, four copy-source paths are established between one copy-source storage volume 143S and one copy-source host volume 133S. The black circles on the respective dotted lines show the information elements configuring the paths. More specifically, as path-configuring information elements, there are a copy-source host volume identifier (for example, "HV01"), an HBA port 131S identifier (for example, "HP01"), a CHA port 141S identifier (for example, "SP01"), and a copy-source storage volume identifier (for example, "SV01"). Hereinafter, at least one of the copy-source host volume, HBA port, CHA port or copy-source storage volume may be shown using the identifier rather than the reference numeral.

The redundancy of the copy-source path linking the copy-source host volume HV01 and the copy-source storage volume SV01 is not determined based on the number of copy-source paths (for example, four), but rather is determined on the basis of which of these plurality of copy-source paths is online (active) and which is offline (passive). More specifically, for example, the more active copy-source paths there are among the plurality of copy-source paths, the higher the copy-source redundancy, and conversely, the fewer the active copy-source paths, the lower the copy-source redundancy. In this embodiment, the configured copy-source redundancy is reflected (for example, copied) in the second computer system 111. This reflection can be carried out regularly, or can be done when the copy-source redundancy changes. In other words, the copy-source redundancy can be reflected in the copy-target computer system 111T either synchronously or asynchronously when this copy-source redundancy changes. Furthermore, when the copy-source redundancy is reflected in the copy-target computer system 111T, copy-target redundancy information denoting the decided copy-target redundancy is sent so that the copy-target redundancy, which is decided on the basis of the copy-source redundancy, is configured in the copy-target host mapped to the copy-source host. The transmission destination of the copy-target redundancy information is the copy-target host 105T in this embodiment. However, the present invention is not limited to this, and the transmission destination of the copy-target redundancy information can also be the copy-source storage volume 143S (or the copy-target storage volume 143T), as will be explained in the second embodiment described hereinbelow.

When the copy-source host volume HV01 in the copy-source host 105S is specified from the below-described operations software as the I/O destination, an I/O command specifying the copy-source storage volume SV01 mapped to the copy-source host volume HV01 is sent from the copy-source host 105S. At this time, the I/O command goes by way of an online copy-source path selected by the below-described copy-source multi-path management software from the plurality of online copy-source paths connected to the copy-source host volume HV01.

For example, at least one of the following two reasons can be given as the purpose for making a path redundant.

(1) Path error avoidance: When an error occurs in any path due to the physical disconnection of a FC cable or the like, operation can continue because the desired storage volume can be accessed using another active copy-source path.

(2) Load balancing: A CHA port and FC cable are ordinarily used by a plurality of hosts. For this reason, the load on a certain CHA port or FC cable intensifies in line with an increase in traffic, and can potentially lead to a drop in access performance to the storage volume. Making a path redundant can balance the load to the CHA port or FC cable, making it possible to avoid performance degradation.

Copy-source redundancy, for example, is decided in accordance with at least one of the performance, frequency of use, and importance of the operation of the below-described operations software executed by the copy-source host 105S. The administrator of the copy-source host 105S and/or copy-source storage system 101S optimizes copy-source redundancy to meet safety and performance requirements. This optimization is not something that is only implemented one time when the copy-source host 105S and/or copy-source storage system 101S are installed, but rather, for example, must be changed frequently in accordance with daily changes in operation (for example, at least one of characteristic feature, frequency of use, and importance).

The redundancy of the copy-source path changes in accordance with the operation of the below-described copy-source multi-path management software installed in the copy-source host 105S. If a desired copy-source path is offline, this copy-source path constitutes a logically disconnected state, and if the desired copy-source path is online, this copy-source path constitutes a logically connected state.

Further, the logical connection of the copy-source path can be controlled by LUN security information and FC switch zoning, which will be described below.

Zoning is a type of security function. More specifically, for example, a zoning table 171S is stored in a FC switch 103S storage resource (for example, a memory). A combination of viable ports (for example, a set comprising the identifier of the HBA port 131S and the identifier of the CHA port 141S) can be configured in the zoning table 171S for each switching port 121S of the FC switch 103S. Based on this zoning table 171S, control is exercised to determine whether or not a command received from the HBA port 131S of the copy-source host 105S is transferred to the CHA port 141S of the copy-source storage system 101S.

Figures 3A, 3B:
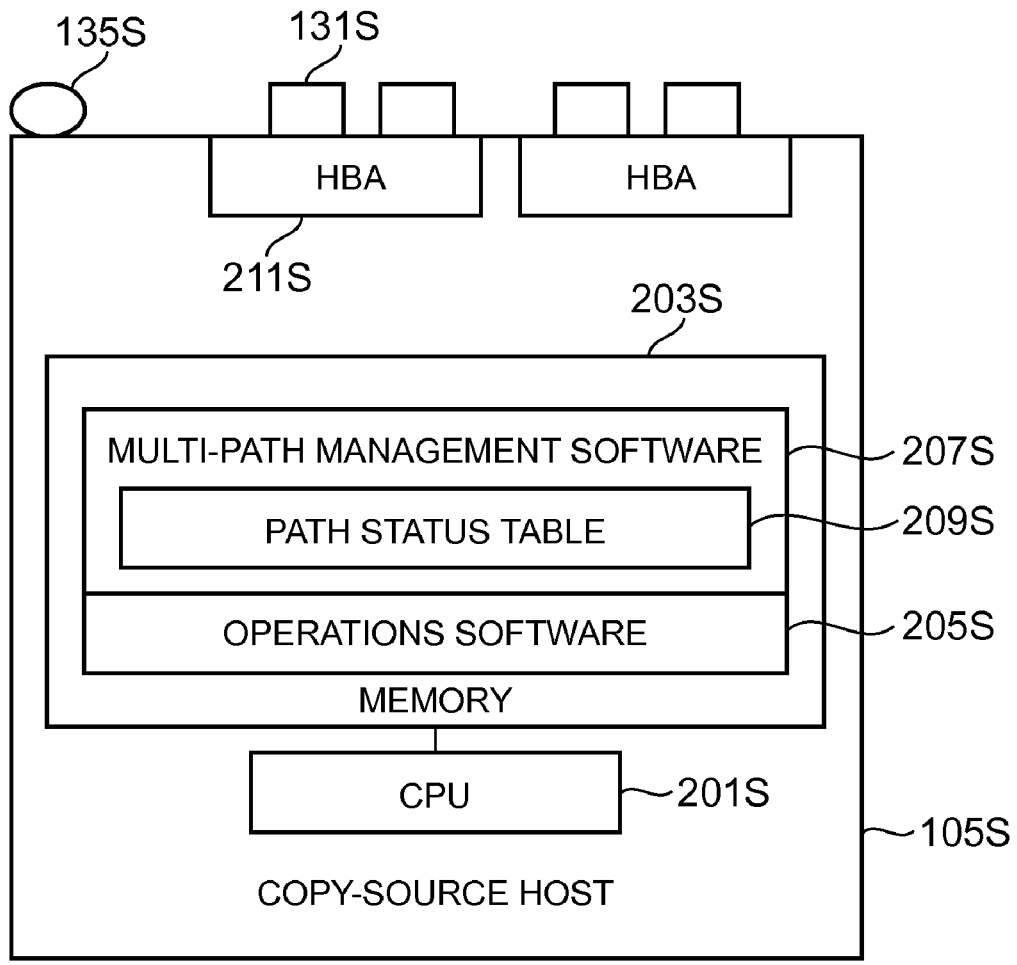
FIG. 3A shows an example of the configuration of the copy-source host.
FIG. 3B shows an example of the configuration of a path status table.

FIG. 3A shows an example of the configuration of the copy-source host 105S.

The copy-source host 105S is the computer for accessing the copy-source storage volume 143S comprised in the copy-source storage system 101S. The copy-source host 105S, for example, comprises a CPU 201S, memory 203S, HBA (Host Bus Adapter) 211S, which has the HBA port 131S, and a port 135S that is connected to the IP network. The memory 203S, for example, stores, as computer programs to be executed by the CPU 201S, an application program, such as operations software 205S for executing a prescribed operation, and multi-path management software (hereinafter, copy-source multi-path management software) 207S for managing the respective pluralities of copy-source paths connected to respective copy-source host volumes.

When the copy-source host volume HV01 is specified as the I/O destination by the operations software 205S, the copy-source multi-path management software 207S selects one online copy-source path from among the plurality of online copy-source paths connected to the copy-source host volume HV01 in accordance with either random or prescribed rules (for example, a load balancing algorithm). An I/O command, which specifies the copy-source storage volume SV01 mapped to the specified copy-source host volume HV01, is sent via the selected copy-source path.

In addition to information denoting what configuration of copy-source paths are connected to which copy-source host volumes, the copy-source multi-path management software 207S also manages the path status table 209S for managing the states of the respective copy-source paths. A copy-source host volume identifier, the number of online copy-source paths, and the number of offline copy-source paths are recorded in the path status table 209S for each copy-source host volume.

Figures 4A, 4B, 4C:
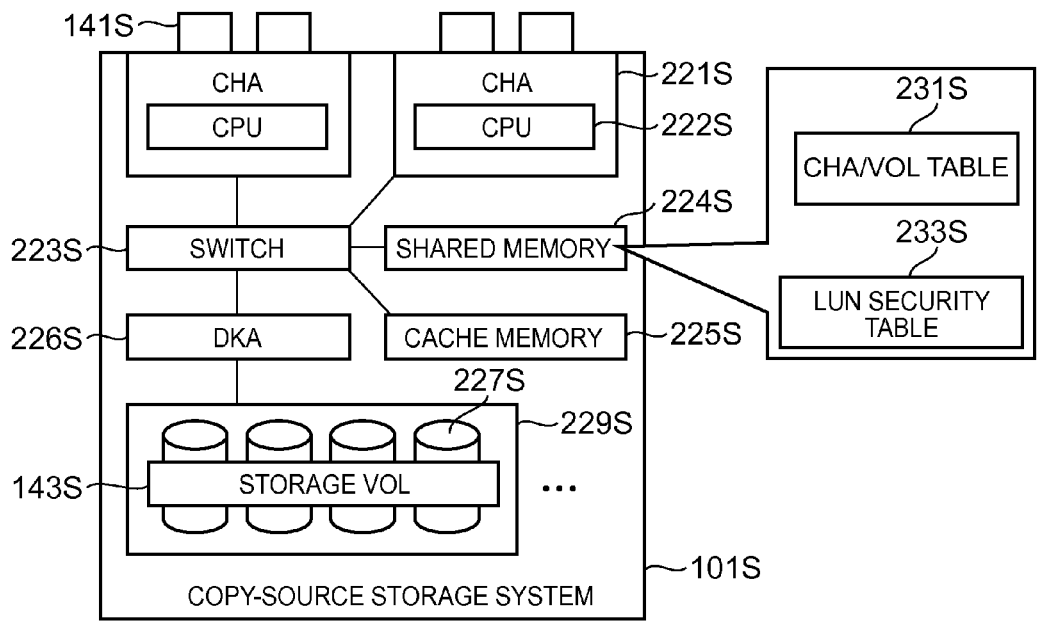
FIG. 4A shows an example of the configuration of a copy-source storage system.
FIG. 4B shows an example of the configuration of a CHA/VOL table.
FIG. 4C shows an example of the configuration of a LUN security table.

FIG. 4A shows an example of the configuration of the copy-source storage system 101S.

The copy-source storage system 101S, for example, can be configured as a RAID (Redundant Arrays of Independent (or Inexpensive) Disks) system comprising a large number of physical storage devices (for example, HDD) 227S arranged in an array. As a controller, for example, the copy-source storage system 101S comprises a CHA (Channel Adapter) 221S, DKA (Disk Adapter) 226S, switch 223S, shared memory 224S, and cache memory 225S. The controller of the copy-source storage system 101S controls access to the physical storage devices 227S. Furthermore, for example, the functions of the copy-source storage system 101S controller can also be mounted in the FC (Fibre Channel) switch 103S, and the copy-source storage system 101S can be realized by combining the FC switch 103S with a plurality of physical storage devices 227S.

The CHA 221S has one or a plurality of communication ports (CHA port) 141S, which is communicably connected to an external device (for example, the copy-source host 105S), and is for carrying out data communications with the external device. The CHA 221S is configured as a microcomputer system (for example, a circuit board), which comprises a CPU 222S and a memory. The CHA 221S, for example, upon receiving a write command from the copy-source host 105S, writes the write-targeted data to the cache memory 225S. Further, upon receiving a read command from the copy-source host 105S, the CHA 221S sends to the copy-source host 105S read-targeted data, which the DKA 226S has read out from the physical storage device 227S and written to the cache memory 225S.

The DKA 226S has one or a plurality of communication ports, which is communicably connected to the respective physical storage devices 227S, and is for carrying out data communications with the physical storage devices 227S. The DKA 226S is configured as a microcomputer system (for example, a circuit board), which comprises a CPU and a memory. The DKA 226S, for example, writes write-targeted data, which has been written to the cache memory 225S from the CHA 221S, to the physical storage device 227S, and writes read-targeted data read out from the physical storage device 227S to the cache memory 225S.

The switch 223S, for example, is a crossbar switch, and is a device, which interconnects the CHA 221S, DKA 226S, shared memory 224S, and cache memory 225S. Instead of the switch 223S, a bus or other such type of connector can also be used.

The shared memory 224S, for example, can be configured from either a nonvolatile or volatile semiconductor memory. The shared memory 224S, for example, stores control information used to control the copy-source storage system 101S. As control information, for example, there a CHA/VOL table 231S and a LUN security table 233S. The CHA/VOL table 231S, as shown in FIG. 4B for example, is a table denoting which CHA 221S can access which copy-source storage volume 143S. The LUN security table 233S, as shown in FIG. 4C for example, is a table denoting what LUN security information has been mapped to which CHA port 141S (which port identifier) of which CHA 221S (which CHA identifier). As used here, LUN security information is information denoting the HBA port 131S with the type of identification information (for example, a WWN) that is allowed access.

The cache memory 225S, for example, can be configured from a volatile semiconductor memory. The cache memory 225S stores write-targeted data received from the copy-source host 105S, and read-targeted data read out from the physical storage device 227S. Furthermore, the shared memory 224S and cache memory 225S can be configured as respectively individual memories as in this embodiment, or can be configured as a single memory.

In the copy-source storage system 101S, for example, a RAID group 229S is configured from a plurality of physical devices 227S. The RAID group 229S, for example, provides a redundant storage mode based on RAID 1 or RAID 5. The copy-source storage volume 143S is created by allocating one portion each of the respective storage areas of the plurality of physical storage devices 227S comprised in the RAID group 229S. The copy-source storage volume 143S is provided to the copy-source host 105S from the copy-source storage system 101S.

Figure 5A:
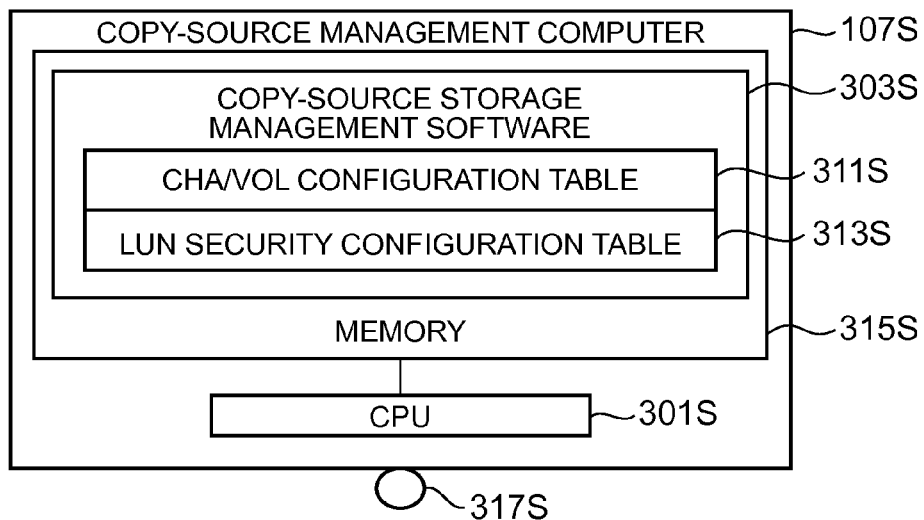
FIG. 5A shows an example of the configuration of a copy-source management computer.

FIG. 5A shows an example of the configuration of the copy-source management computer 107S.

The copy-source management computer 107S is a computer for managing the copy-source storage system 101S. The copy-source management computer 107S, for example, comprises a CPU 301S, memory 315S, and port 317S connected to the IP network. The memory 315S, for example, stores as a computer program to be executed by the CPU 301S copy-source storage management software 303S for managing the copy-source storage system 101S. The copy-source storage management software 303S manages a CHA/VOL configuration table 311S and a LUN security configuration table 313S. The configurations of the CHA/VOL configuration table 311S and LUN security configuration table 313S are substantially the same as the configurations of the CHA/VOL table 231S shown in FIG. 4B and LUN security table 233S shown in FIG. 4C.

Figure 5B:
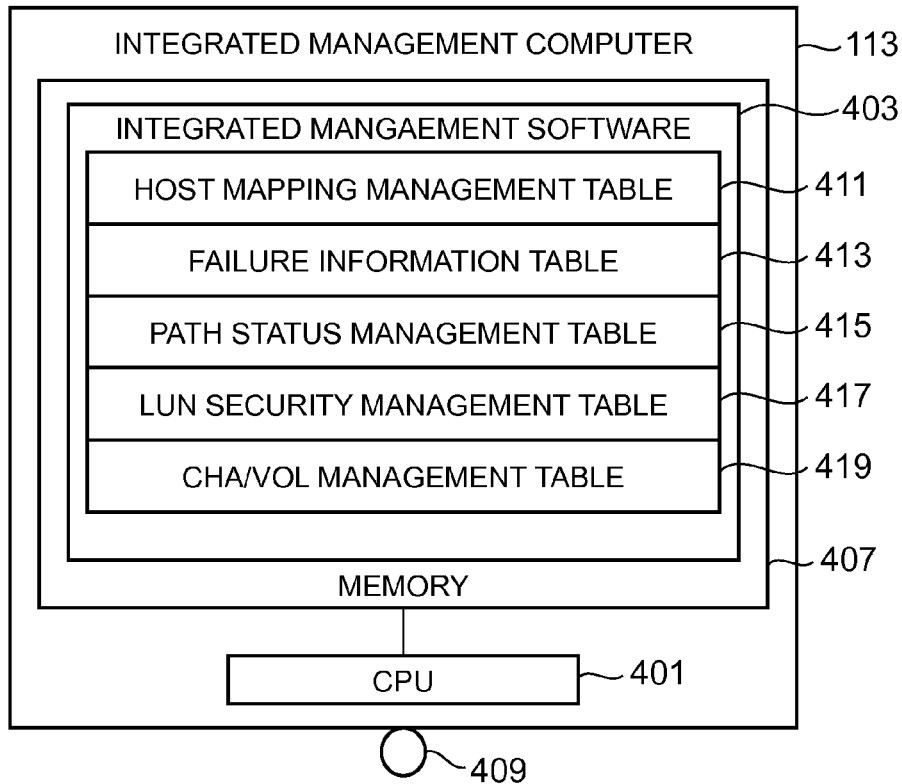
FIG. 5B shows an example of the configuration of an integrated management computer.

FIG. 5B shows an example of the configuration of the integrated management computer 113.

The integrated management computer 113 is for managing volume replication in accordance with a remote copy between the copy-source storage system 101S and the copy-target storage system 101T. The integrated management computer 113, for example, can configure the remote copy type for a storage volume pair as either synchronous or asynchronous, and can configure the storage volume pair. Further, the integrated management computer 113 can also reflect the copy-source redundancy in the copy-target computer system 111T.

The integrated management computer 113, for example, comprises a CPU 401, memory 407, and a port 409 connected to an IP network. The memory 407, for example, stores, as a computer program executed by the CPU 401, integrated management software 403 for carrying out the reflection of copy-source redundancy in the copy target and so forth.

The integrated management software 403 manages a mapping management table 411, failure information table 413, path status management table 415, LUN security management table 417, and CHA/VOL management table 419. The configurations of the CHA/VOL management table 419 and LUN security management table 417 are substantially the same as those of the CHA/VOL table 231S shown in FIG. 4B, and the LUN security table 233S shown in FIG. 4C. As the mapping management table 411, for example, there is the host volume mapping management table 411A shown in FIG. 6A, the HBA port mapping management table 411B shown in FIG. 16A, and the CHA port mapping management table 411C shown in FIG. 16B. Normally, the copy-source host volume 133S and copy-target host volume, which are respectively mapped to the copy-source storage volume 143S and the copy-target storage volume 143T configuring volume pairs, are mapped to one another.

As shown in FIG. 6A, the host volume mapping management table 411A is for managing which copy-source host volume 133S is mapped to which copy-target host volume; the number of copy-source paths connected to the copy-source host volume 133S; and the number of copy-target paths connected to the copy-target host volume. More specifically, for example, the host volume mapping management table 411A records for each copy-source host volume 133S an identifier for the copy-source host volume 133S (for example, a number); the number of copy-source paths connected to this copy-source host volume 133S (the total of the number of online copy-source paths and offline copy-source paths); the identifier of the copy-source host 105S having this copy-source host volume 133S; the identifier (for example, a number) of the copy-target host volume mapped to this copy-source host volume 133S; the number of copy-target paths connected to this copy-target host volume (the total of the number of online copy-target paths and offline copy-target paths); and the identifier of the copy-target host 105T having this copy-target host volume. Furthermore, in the copy-source computer system 111S and copy-target computer system 111T, the number of hosts and/or host volumes can differ. In this case, the hosts and/or host volume selected in accordance with arbitrary criteria by the user and/or administrator as being highly important are made the copy-source host, copy-source host volume, copy-target host, and copy-target host volume (that is, the information related to these hosts and/or host volumes is recorded in the host volume mapping management table 411A).

As shown in FIG. 16A, the HBA port mapping management table 411B is for managing which HBA port in the copy source (hereinafter, copy-source HBA port) is mapped to which HBA port in the copy target (hereinafter, copy-target HBA port). More specifically, for example, the HBA port mapping management table 411B records for each copy-source HBA port the identifier (for example, a number and/or WWN) of the copy-source HBA port; the identifier of the copy-source host 105S having this copy-source HBA port; the identifier (for example, a number and/or WWN) of the copy-target HBA port mapped to this copy-source HBA port; and the identifier of the copy-target host 105T having this copy-target HBA port.

As shown in FIG. 16B, the CHA port mapping management table 411C is for managing which CHA port in the copy source (hereinafter, copy-source CHA port) is mapped to which CHA port in the copy target (hereinafter, copy-target CHA port). More specifically, for example, the CHA port mapping management table 411C records for each copy-source CHA port the identifier (for example, a number and/or WWN) of the copy-source CHA port; the identifier of the copy-source storage system 101S having this copy-source CHA port; the identifier (for example, a number and/or WWN) of the copy-target CHA mapped to this copy-source CHA port; and the identifier of the copy-target storage system 101T having this copy-target CHA port.

The preceding is an explanation of the mapping management tables 411.

The failure information table 413 records information denoting the presence or absence of a failure in the copy-source computer system 101S.

The path status management table 415 is for managing the number of online paths and the number of offline paths for the respective copy-source host volumes and the respective copy-target host volumes. More specifically, for example, as shown in FIG. 6B, the path status management table 415 records for each copy-source host volume 133S the identifier (for example, a number) of the copy-source host volume 133S; the number of online copy-source paths (copy-source-ON number) connected to this copy-source host volume 133S; the number of offline copy-source paths (copy-source-OFF number) connected to this copy-source host volume 133S; the identifier of the copy-source host 105S having this copy-source host volume 133S; the identifier (for example, a number) of the copy-target host volume mapped to this copy-source host volume 133S; the identifier of the copy-target host 105T having this copy-target host volume; the number of online copy-target paths (copy-target-ON number) connected to this copy-target host volume; and the number of offline copy-target paths (copy-target-OFF number) connected to this copy-target host volume.

The processing carried out by this embodiment will be explained below.

FIG. 7 shows an example of the flow of processing carried out by the copy-source multi-path management software 207S.

The copy-source multi-path management software 207S waits for a change in the status of a copy-source path to be specified by the user (S101).

The copy-source multi-path management software 207S, upon receiving a copy-source path and a change to the status thereof from the user (S102), changes the status recorded in the path status table 209S mapped to the specified copy-source path (S103). That is, the path status table 209S is updated. Furthermore, "change the status" in this embodiment signifies that, if the pre-change status is online, the copy-source path is changed to offline, and if the pre-change status is offline, the copy-source path is changed to online. Thus, changing the status of the copy-source path results in the copy-source redundancy for the copy-source host volume 133S, to which the status-changed copy-source path is connected, being changed as well.

Subsequent to S103, the copy-source multi-path management software 207S sends the information in the record (row) in which the post-change status is recorded in the post-update path status table 209S to the integrated management computer 113 (S104). Hereinafter, this sent information will be referred to as the "copy-source redundancy information". The copy-source redundancy information, for example, comprises the copy-source host volume identifier; the number of online copy-source paths (ON-number); and the number of offline copy-source paths (OFF-number).

If the copy-source multi-path management software 207S detects a failure in the copy source (for example, a failure in the copy-source storage system 101S) (S105: YES), the copy-source multi-path management software 207S notifies the integrated management computer 113 of the occurrence of the failure (S106). Upon receiving this notification, the integrated management computer 113 writes information denoting that a failure has occurred in the failure information table 413.

Figure 8:
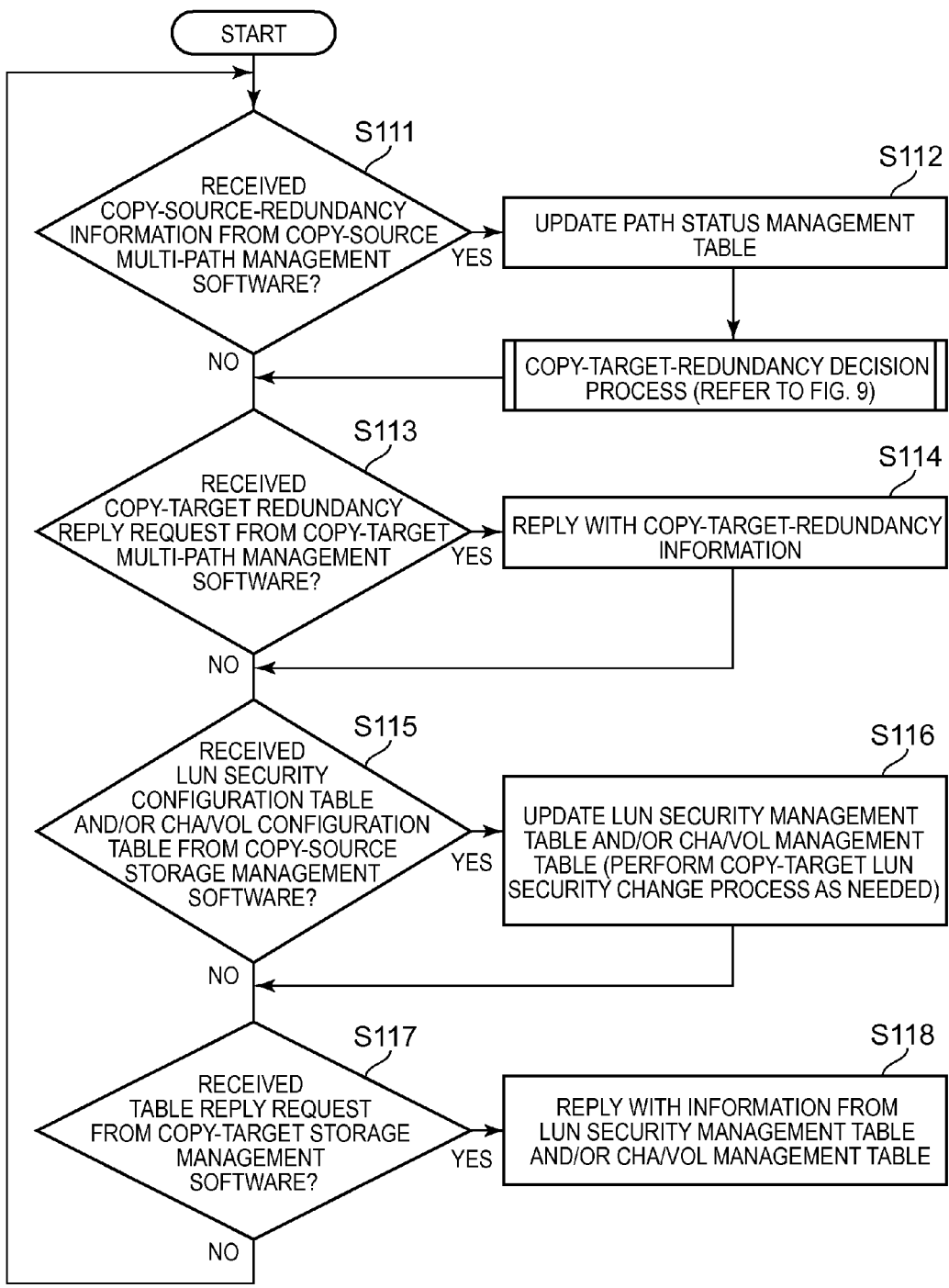
FIG. 8 shows an example of the flow of processing carried out by integrated management software.

FIG. 8 shows an example of the flow of processing carried out by the integrated management software 403.

The integrated management software 403, upon receiving the copy-source redundancy information from the copy-source multi-path management software 207S of a certain copy-source host 105S (S111: YES), updates the path status management table 415 (S112). More specifically, the integrated management software 403 updates the ON-number and OFF-number in the path status management table 415 mapped to the copy-source host volume identifier comprised in the received copy-source redundancy information to the ON-number and OFF-number comprised in the received copy-source redundancy information.

Thereafter, the integrated management software 403 executes the process (hereinafter, the copy-target redundancy decision process) for deciding the copy-target redundancy of the copy-target host volume mapped to the copy-source host volume 133s for which the copy-source redundancy changed.

The integrated management software 403, upon receiving a copy-target redundancy reply request from the copy-target multi-path management software 207S of a certain copy-target host 105T (S113: YES), acquires the copy-target redundancy information mapped to this copy-target host 105T from the path status management table 415, and sends the acquired copy-target redundancy information to this copy-target host 105T (S114).

The integrated management software 403, upon receiving a CHA/VOL configuration table 311S and/or LUN security configuration table 313S from the copy-source storage management software 303S in the copy-source management computer 107S (S115: YES), writes the information recorded in the received tables 311S and/or 313S to the LUN security management table 417 and/or CHA/VOL management table 419 (S116). In S116, the integrated management software 403 carries out a copy-target LUN security change process as required. A case in which a copy-target LUN security change process becomes necessary, and the copy-target LUN security change process will be explained hereinbelow.

The integrated management software 403, upon receiving a table reply request from the copy-target storage management software in the copy-target management computer 107T (S117: YES), acquires information related to the copy target recorded in the LUN security management table 417 and/or CHA/VOL management table 419, and sends the acquired information to the copy-target management computer 107T (S118). Furthermore, the "information related to the copy target" referred to here, in terms of the LUN security management table 417, is the identifier of the CHA in the copy-target computer system 111T, the identifier of the CHA port, and the LUN security information, and in terms of the CHA/VOL management table 419, is the identifier of the CHA in the copy-target computer system 111T, and the identifier of the copy-target storage volume.

Figure 9:
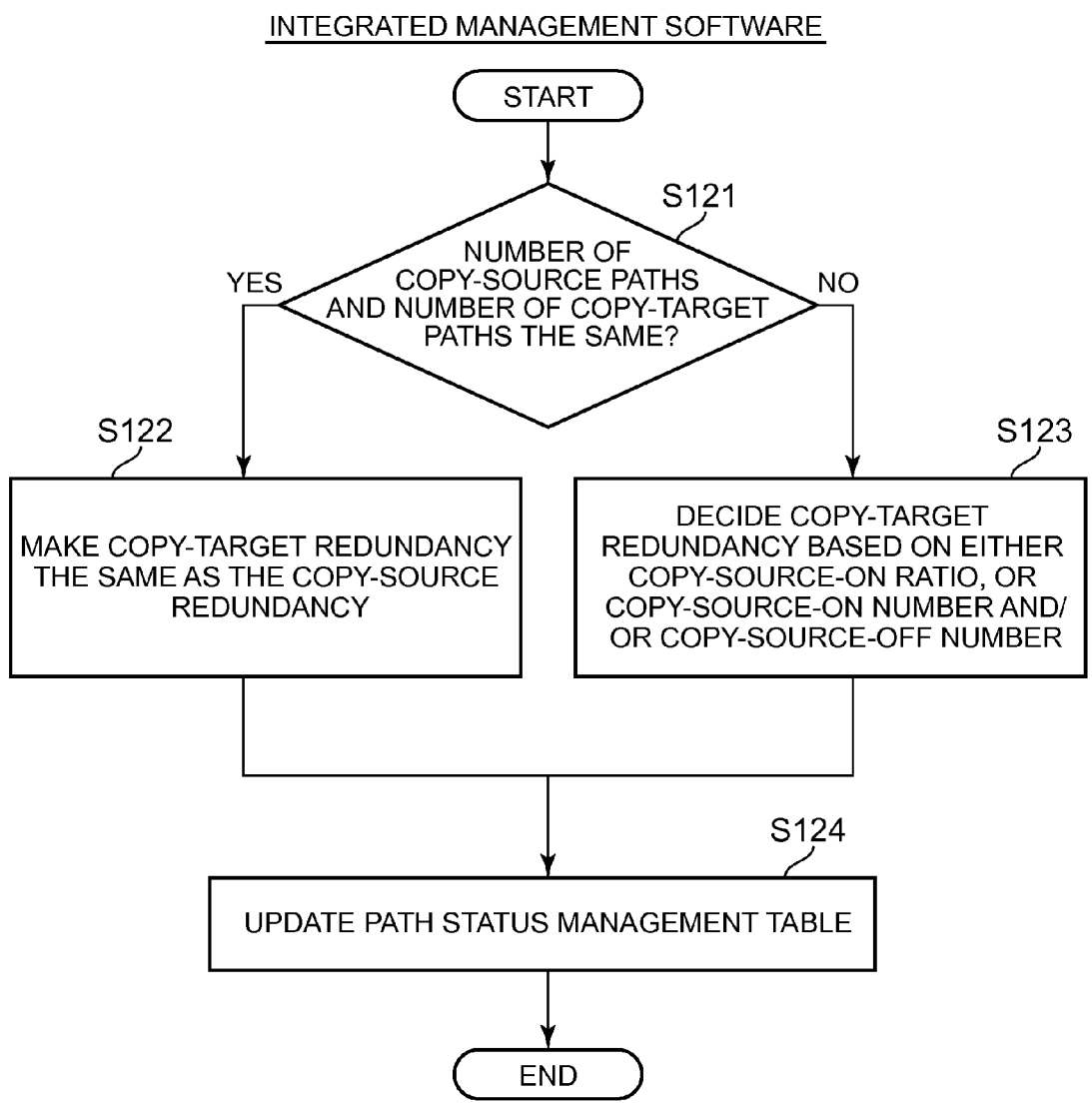
FIG. 9 shows an example of the flow of a copy-target redundancy decision process.

FIG. 9 shows an example of the flow of copy-target redundancy decision processing.

The integrated management software 403 references the host volume mapping management table 411A, specifies the number of copy-source paths (hereinafter, copy-source-path number) connected to the copy-source host volume 133S for which the copy-source redundancy has changed, and the number of copy-target paths (hereinafter, copy-target-path number) connected to the copy-target host volume mapped to this copy-source host volume 133S, and compares the specified copy-source-path number and copy-target-path number (S121).

If the result of the comparison in S121 is that the copy-source-path number and copy-target-path number are the same (S121: YES), the integrated management software 403 decides the copy-target redundancy to be the same redundancy as the post-change copy-source redundancy (S122). That is, the copy-target-ON number denoted by the decided copy-target redundancy is the same as the copy-source-ON number denoted by the post-change copy-source redundancy, and therefore the copy-target-OFF number denoted by the decided copy-target redundancy is the same as the copy-source-OFF number denoted by the post-change copy-source redundancy.

Conversely, if the result of the comparison of S121 is that the copy-source-path number and copy-target-path number are different (S121: NO), the integrated management software 403 decides the copy-target redundancy based on either the ON-ratio according to the post-change copy-source redundancy, or the post-change copy-source-ON number and/or copy-target-ON number (S123). Furthermore, the ON-ratio is the percentage of the ON-number relative to the number of paths, and, for example, the ON-ratio according to the post-change copy-source redundancy is the percentage of the copy-source-ON number relative to the copy-source-path number. Hereinafter, the ON-ratio according to the post-change copy-source redundancy may be referred to as the "copy-source-ON ratio", and the ON-ratio in the copy target may be referred to as the "copy-target-ON ratio". Further, the ON-ratio may be expressed as a fraction. The numerator in these cases is the ON-number, and the denominator is the number of paths.

Subsequent to either S122 or S123, the integrated management software 403 writes the copy-target-ON number and copy-target-OFF number according to the decided copy-target redundancy in the path status management table 415 (S124).

The preceding is an explanation of the processing carried out by the integrated management software 403. Furthermore, if, for example, the integrated management software 403 receives the copy-source redundancy information and updates the path status management table 415, the integrated management software 403 can carry out a copy-target redundancy decision process, and can dynamically (actively) send the copy-target redundancy information denoting the decided copy-target redundancy to the copy-target host 105T without receiving copy-target redundancy reply request from the copy-target host 105T. The copy-target host 105T that becomes the transmission-destination here is the copy-target host having the copy-target host volume specified from the sent copy-target redundancy information. Similarly, if, for example, the integrated management software 403 receives the CHA/VOL configuration table 311S and/or the LUN security configuration table 313S, and updates the LUN security management table 417 and/or the CHA/VOL management table 419, the integrated management software 403 can dynamically (actively) send the information related to the copy target recorded in the LUN security management table 417 and/or CHA/VOL management table 419 to the copy-target management computer 107T without receiving a table reply request from the copy-target management computer 107T.

Figure 10:
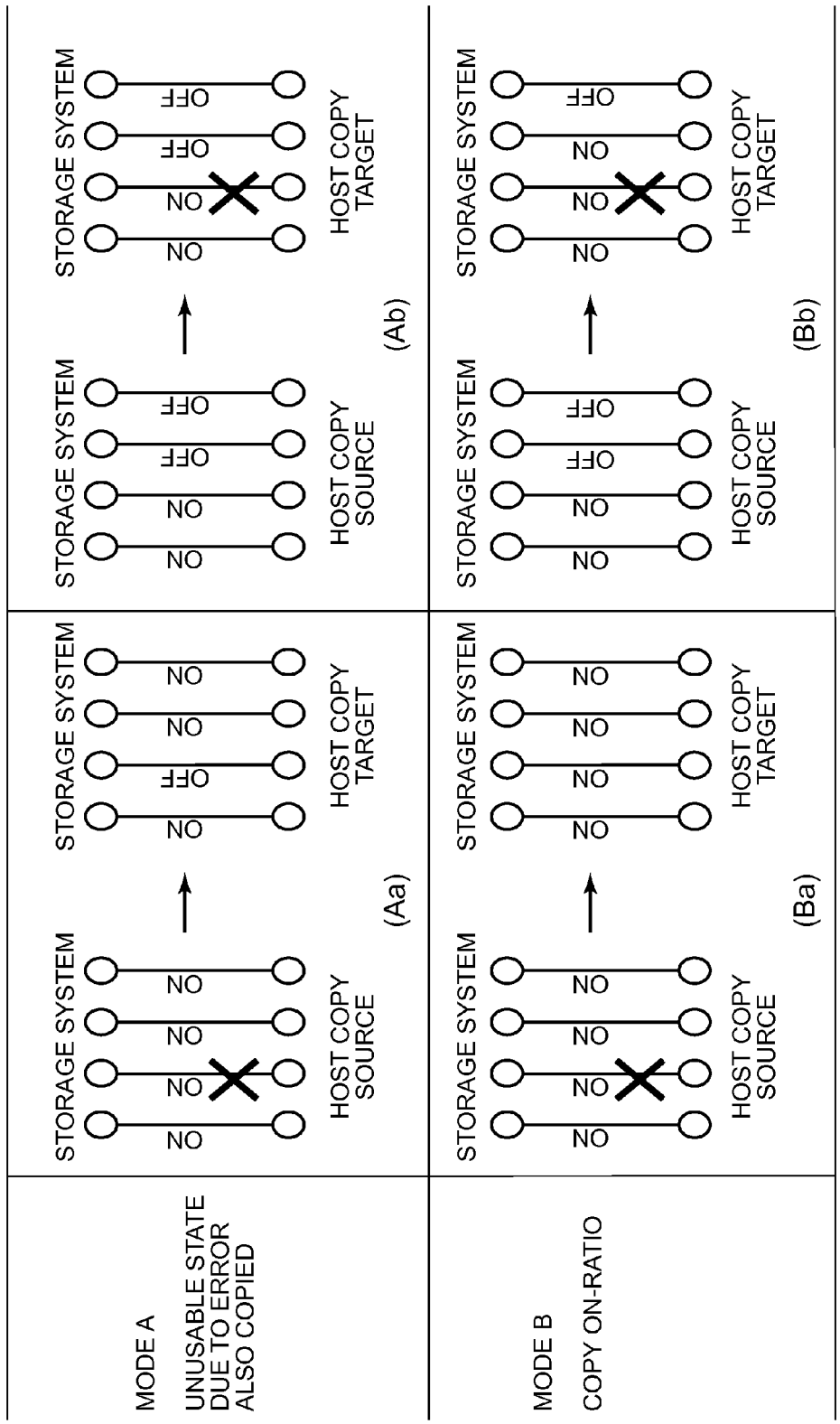
FIG. 10 is a schematic diagram of a mode for deciding copy-target redundancy.

However, there are two modes A and B for deciding the copy-target redundancy in the above-described S123, for example, as shown in FIG. 10. FIG. 10 (Aa) and (Ba) is a case in which the copy-target-path number is larger than the copy-source-path number, and FIG. 10 (Ab) and (Bb) is a case in which the copy-target-path number is smaller than the copy-source-path number. Further, in FIG. 10, the paths marked with an X indicate the occurrence of errors, and these paths are not counted in the copy-source-path number or the copy-target-path number.

Mode A is based on the post-change copy-source-ON number and/or copy-target-ON number, and more specifically, is a mode for copying an unusable state due to an error. According to this mode A, for example, when the copy-target-path number is larger than the copy-source-path number as shown in FIG. 10 (Aa), the states of all the copy-source paths are respectively copied to the copy-target paths, and the state of the surplus copy-target path is set to offline to coincide with the error copy-source path. Further, for example, when the copy-target-path number is smaller than the copy-source-path number as shown in FIG. 10 (Ab), the surplus copy-source path, the state of which is not copied to the copy target, is made an online copy-source path. If, for example, the number of offline copy-source paths is greater that the copy-target-path number, the state of one copy-target path is set online, and the states of the remainder of the copy-target paths are set to offline. Further, mode A is not limited to a copy that prioritizes offline like this, but rather can also carry out a copy that prioritizes online. More specifically, for example, the surplus copy-source path for which the state is not copied to the copy target is set to an offline copy-source path, and if, for example, the number of online copy-source paths is greater than the copy-target-path number, the state of one copy-target path can be set to offline, and the states of the remainder of the copy-target paths can be set to online.

Mode B is based on the copy-source-ON ratio. According to this mode B, for example, the states of the respective copy-target paths is decided such that the copy-target-ON ratio constitutes the copy-source-ON ratio (for example, 4/4) as shown in FIG. 10 (Ba) (That is, in this example, all the copy-target paths are set online.). Further, as shown in FIG. 10 (Bb), if it is not possible to make the copy-target-ON ratio the same as the copy-source-ON ratio, the states of the respective copy-target paths are decided such that the copy-target-ON ratio (for example 2/3) is as close as possible to the copy-source-ON ratio (for example 2/4). Furthermore, in FIG. 10 (Bb), the copy-target-ON ratio is set to 2/3 in order to prioritize online, but when prioritizing offline, the copy-target-ON ratio can be set to 1/3. That is, in this mode B, the copy-target-ON ratio can be made larger than the copy-source-ON ratio. Further, even if the number of online copy-target paths is larger or smaller than the number of offline copy-target paths, as long as a copy-target-ON ratio that is as close as possible to the copy-source-ON ratio can be obtained, it does not matter which copy-target-ON ratio is used. That is, a copy-target-ON ratio, which is obtained when online is prioritized and the number of online copy-target paths is larger than the number of offline copy-target paths, can be used, and conversely, a copy-target-ON ratio, which is obtained when offline is prioritized and the number of online copy-target paths is smaller than the number of offline copy-target paths, can also be used.

Figure 11:
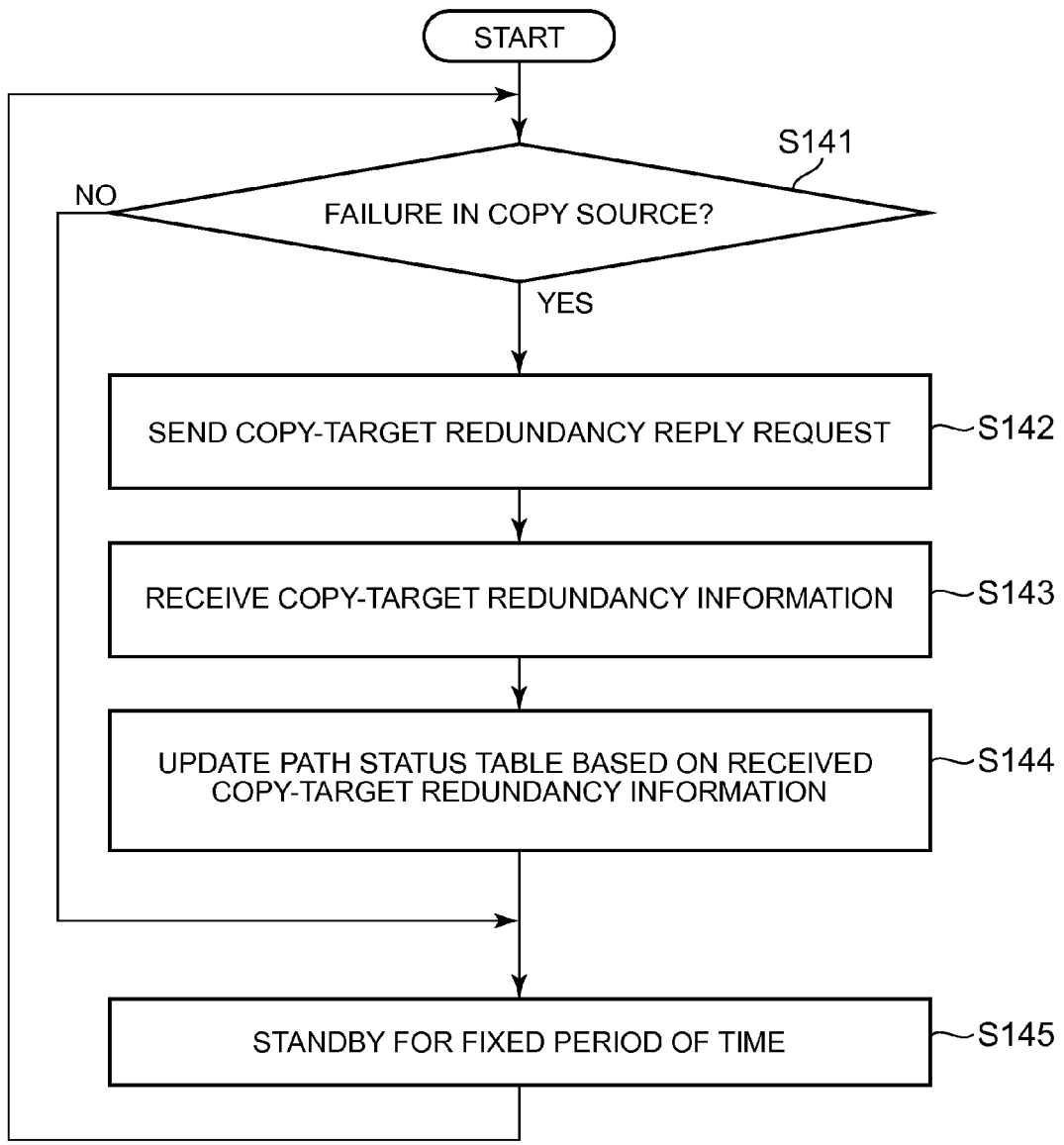
FIG. 11 shows an example of the flow of processing carried out by copy-target multi-path management software.

FIG. 11 shows an example of the flow of processing carried out by copy-target multi-path management software.

The copy-target multi-path management software determines whether or not there is information in the failure information table 413 denoting a failure (S141).

If information denoting a failure is recorded (S141: YES), the copy-target multi-path management software sends a copy-target redundancy reply request to the integrated management computer 113 (S142).

The copy-target multi-path management software, upon receiving the copy-target redundancy information in response to this reply request (S143), writes the received copy-target redundancy information (information comprising the copy-target host volume identifier, the copy-target-ON number and the copy-target-OFF number) to the path status table 209S (S144). Consequently, the post-change (post-configuration) copy-source redundancy is reflected in the copy-target volume mapped to the copy-source volume for which the status of the copy-source path has been changed (configured).

The copy-target multi-path management software transitions to standby for a fixed period of time (S145), and thereafter executes S141.

The preceding is the flow of processing carried out by the copy-target multi-path management software. Furthermore, the copy-target multi-path management software, for example, can regularly send copy-target redundancy reply requests to the integrated management computer 113 regardless of whether or not a failure has occurred in the copy source.

Figure 12:
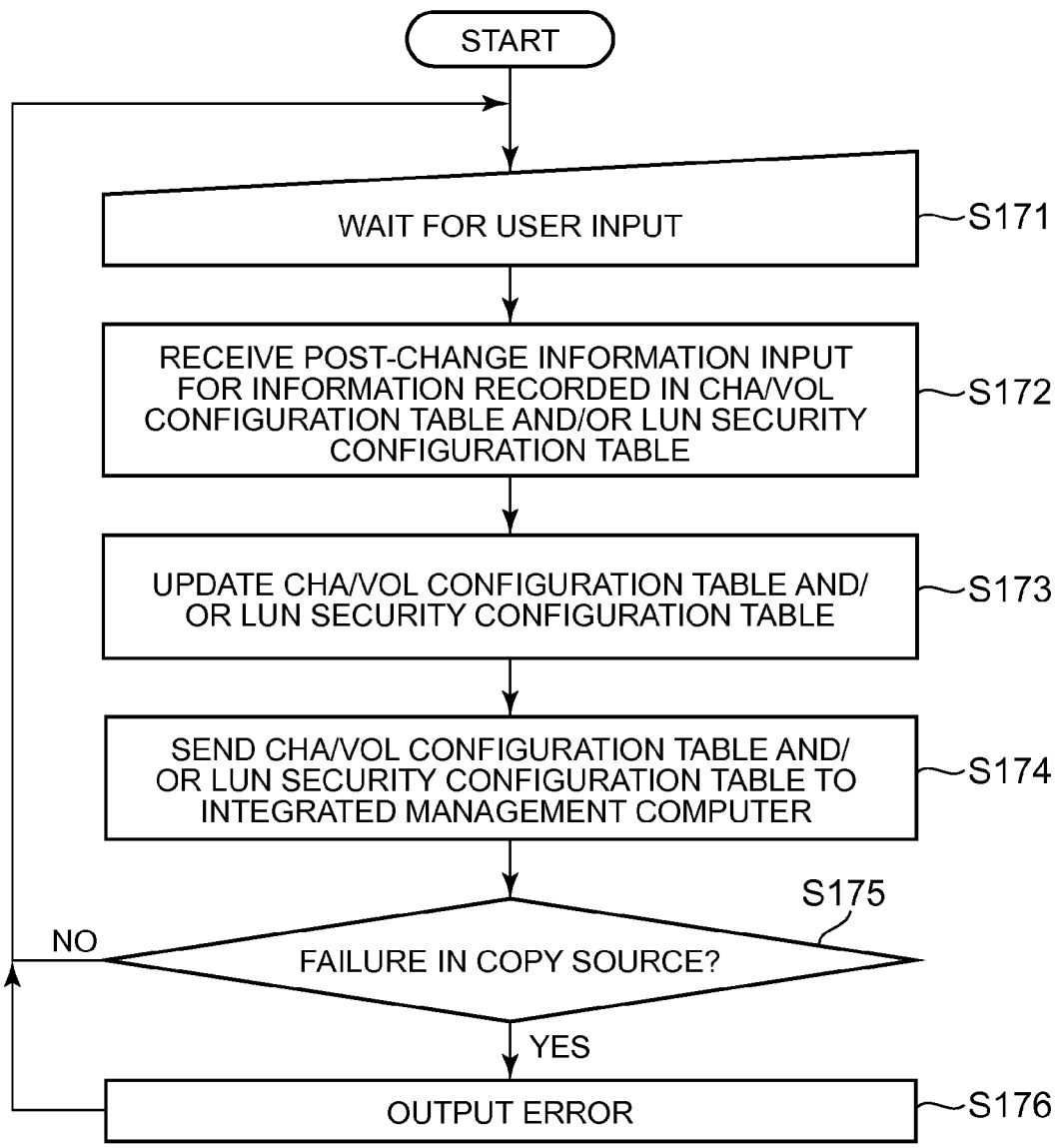
FIG. 12 shows an example of the flow of processing carried out by copy-source storage management software.

FIG. 12 shows an example of the flow of processing carried out by the copy-source storage management software 303S.

The copy-source storage management software 303S waits for post-change information to be inputted from the user as information to be recorded in the CHA/VOL configuration table 311S and/or LUN security configuration table 313S (S171).

The copy-source storage management software 303S, upon receiving the inputted post-change information (S172), writes the post-change information to the CHA/VOL configuration table 311S and/or the LUN security configuration table 313S (S173).

Subsequent to S173, the copy-source storage management software 303S writes the post-change CHA/VOL configuration table 311S and/or LUN security configuration table 313S to the integrated management computer 113 (S104). Only the changed parts can be sent at this time.

Upon detecting a failure in the copy source (for example, a failure of the copy-source storage system 101S) (S175: YES), the copy-source storage management software 303S notifies the integrated management computer 113 of the occurrence of the failure (S176). The integrated management computer 113, upon receiving this notification, writes information denoting the failure in the failure information table 413.

Figure 13:
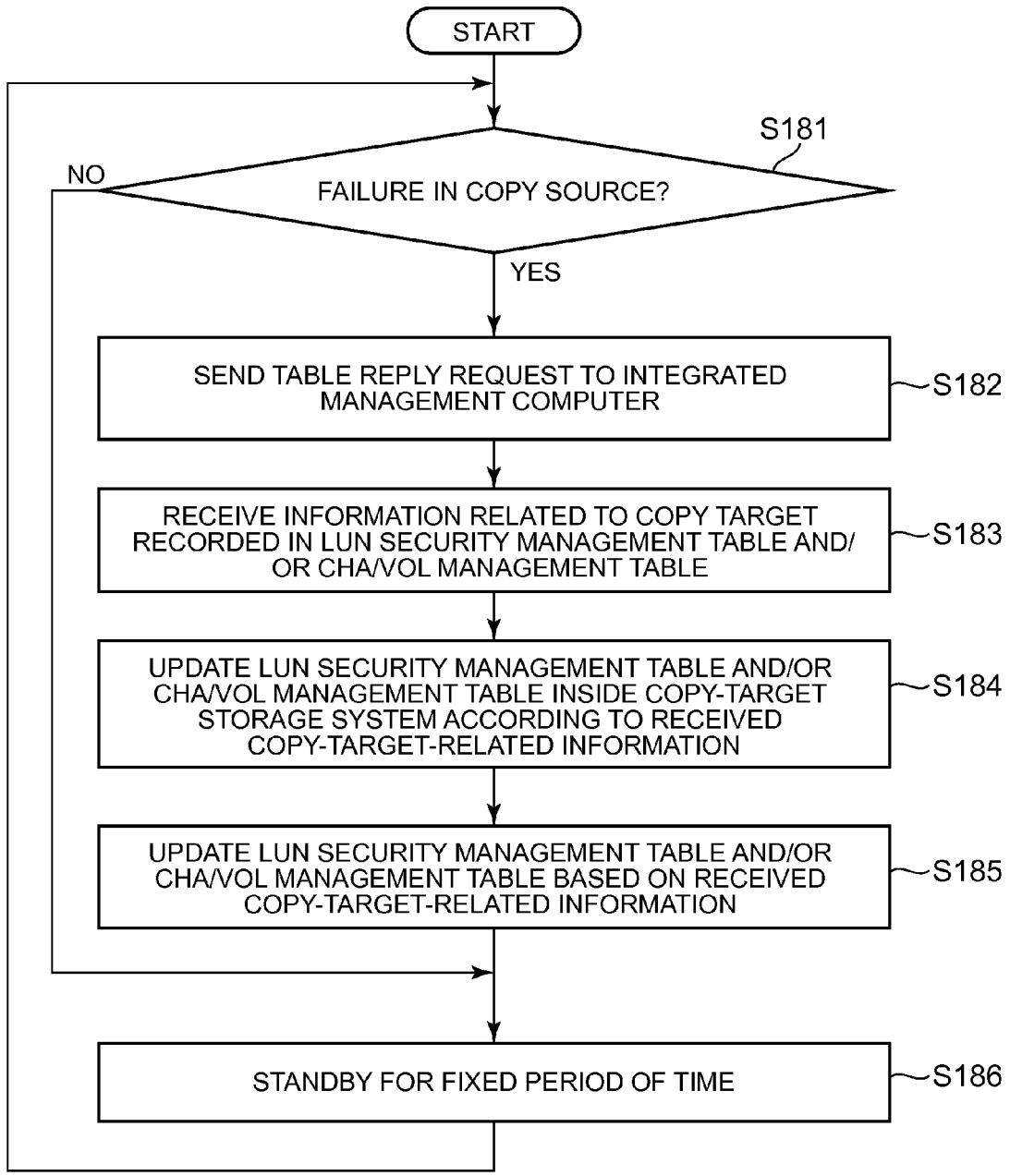
FIG. 13 shows an example of the flow of processing carried out by copy-target storage management software.

FIG. 13 shows an example of the flow of processing carried out by copy-target storage management software.

The copy-target storage management software determines whether or not there is information in the failure information table 413 denoting a failure (S181).

If information denoting a failure is recorded (S181: YES), the copy-target storage management software sends a table reply request to the integrated management computer 113 (S182).

If the copy-target storage management software receives information related to the copy target recorded in the LUN security management table 417 and/or CHA/VOL management table 419 in response to this reply request (S183), the copy-target storage management software writes the received information to the CHA/VOL table and/or LUN security table in the copy-target storage system 101T (S184). Further, the copy-target storage management software writes the received information to the storage CHA/VOL configuration table and/or LUN security configuration table in the copy-target management computer 107T (S185).

The copy-target storage management software transitions to standby for a fixed period of time (S186), and thereafter executes S181.

The preceding is the flow of processing carried out by the copy-target storage management software. Furthermore, the copy-target storage management software, for example, can also regularly send table reply requests to the integrated management computer 113 regardless of whether or not there is a failure in the copy source.

The information written in S184 of FIG. 13 includes a set comprising a copy-target HBA port identifier and a copy-target CHA port identifier specified by the copy-target LUN security change process.

The process that serves to start the copy-target LUN security change process, and the copy-target LUN security change process will be explained below.

LUN security information mapped to a certain copy-source CHA port can be added, changed or deleted in the LUN security table 233S in the copy-source storage system 101S. For example, this is carried out in accordance with an indication from the copy-source management computer 107S. Similarly, LUN security information can also be added, changed or deleted in the LUN security configuration table 313S in the copy-source management computer 107S in this case.

In this case, for example, the identifier of the above-mentioned certain copy-source CHA port, either pre-change or deleted LUN security information (hereinafter, copy-source pre-change security information), and either post-change added or deleted LUN security information (hereinafter, copy-source post-change security information) is sent from the copy-source storage management software 303S to the integrated management computer 113 in S174 of FIG. 12. Furthermore, in the case of an addition to the LUN security information, there is no copy-source pre-change security information.

For example, in S116 of FIG. 8, the integrated management software 403 executes a copy-target LUN security change process. The condition for starting the copy-target LUN security change process, for example, may include the presence of copy-source post-update security information. More specifically, for example, when information denoting that there is copy-source post-update security information configured in the LUN security information in the post-update LUN security configuration table 313, the copy-target LUN security change process starts.

The integrated management software 403 specifies the copy-target CHA port identifier mapped to the identifier of the above-mentioned certain copy-source CHA port by referencing the CHA port mapping management table 411C (refer to FIG. 16B). The integrated management software 403 also specifies the copy-target HBA port identifier, which is mapped to the copy-source pre-update security information (hereinafter, copy-target pre-update LUN security information) and the copy-target HBA port identifier, which is mapped to the copy-source post-update security information (hereinafter, copy-target post-update LUN security information) by referencing the HBA port mapping management table 411B (Refer to FIG. 16A). The integrated management software 403 maps the copy-target post-update LUN security information to the specified copy-target CHA port identifier in the LUN security management table 417. Further, if there is copy-target pre-update LUN security information for the specified copy-target CHA port identifier in the LUN security management table 417, the integrated management software 403 deletes the copy-target pre-update LUN security information.

In S184 of FIG. 13, the post-update information recorded in the LUN security management table 417, that is, the combination of the copy-target CHA port identifier and the copy-target post-update LUN security information is written to the LUN security table in the copy-target storage system 101T. Further, the combination of the copy-target CHA port identifier and copy-target pre-update LUN security information is deleted from this LUN security table.

The addition, change or deletion of LUN security information in the copy source is reflected in the copy target by the above-described series of steps.

According to the above-described first embodiment, the integrated management computer 113 has a host volume mapping management table 411A denoting which copy-target host volume of which copy-target host is mapped to which copy-source host volume of which copy-source host. When copy-source redundancy is changed, copy-source redundancy information denoting the post-change copy-source redundancy for a certain copy-source host volume is sent to the integrated management computer 113. The integrated management computer 113 specifies a certain copy-target host volume mapped to the above-mentioned certain copy-source host volume by using the copy-source host volume identifier comprised in this copy-source redundancy information to reference the host volume mapping management table 411A. The integrated management computer 113 decides the copy-target redundancy for the above-mentioned specified certain copy-target host volume based on the above-mentioned copy-source redundancy. Copy-target redundancy information denoting the decided copy-target redundancy is sent from the integrated management computer 113 to the copy-target host, which has the above-mentioned certain copy-target host volume. This copy-target host configures the sent copy-target redundancy information for this certain copy-target host volume in the copy-target redundancy. Consequently, the copy-source redundancy can be configured in the copy-target host without placing a burden on the user.

Embodiment 2

A second embodiment of the present invention will be explained hereinbelow. The points of difference with the first embodiment will mainly be explained at this time, and explanations of the points shared in common with the first embodiment will be simplified or omitted.

In the first embodiment, copy-target redundancy information is sent to the integrated management computer 113 from the copy-source host 105S, and is sent from the integrated management computer 113 to the copy-target host 105T. In the second embodiment, the route via which the copy-target redundancy information is sent to the copy-target host 105T differs. More specifically, the storage volume is utilized.

Figure 14:
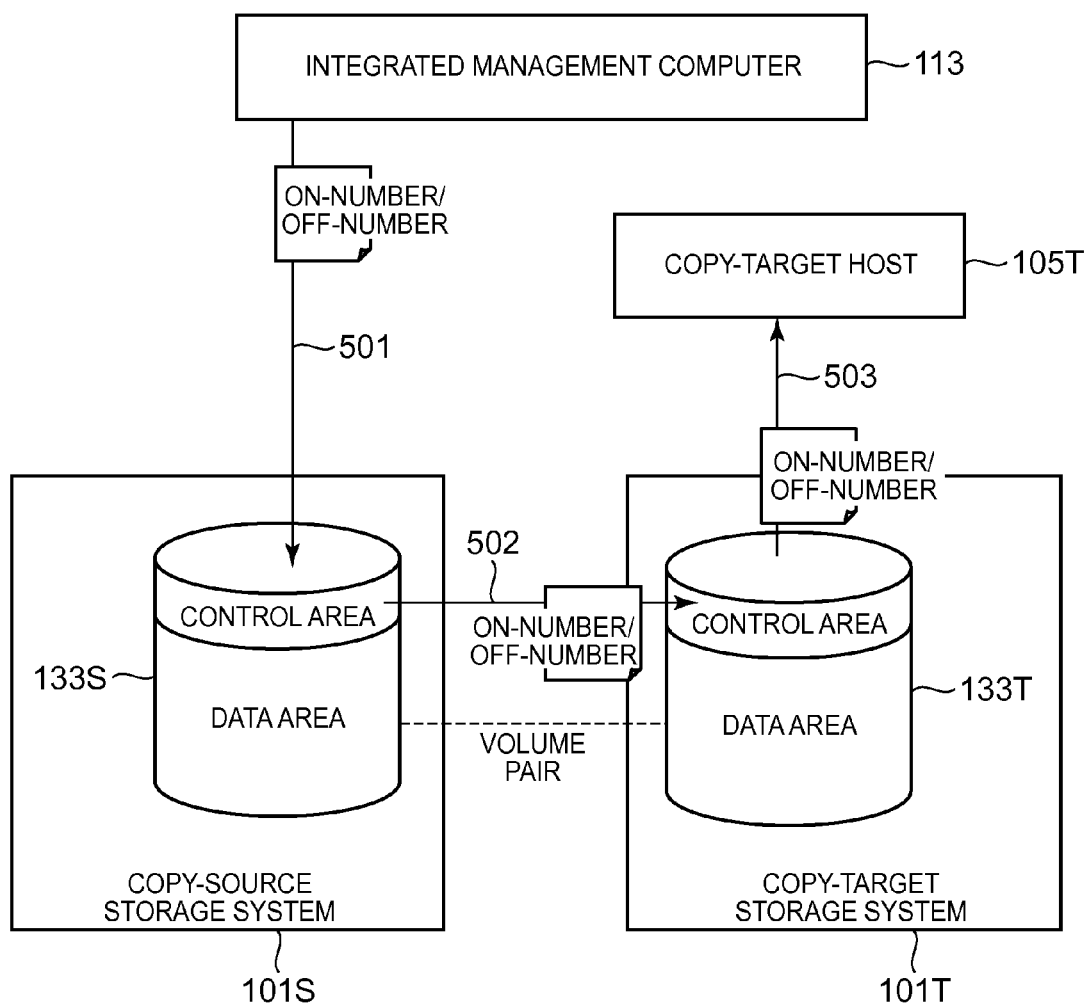
FIG. 14 shows the flow of copy-target redundancy information up until it reaches the copy-target host 105T in a second embodiment of the present invention.

FIG. 14 shows the flow of the copy-target redundancy information until it reaches the copy-target host 105T in a second embodiment of the present invention.

As shown by arrow 501, the integrated management computer 113 (integrated management software 403) writes the copy-target redundancy information to the copy-source storage volume 133S mapped to the copy-source host volume mapped to the changed copy-source redundancy. Both the copy-source storage volume 133S and the copy-target storage volume 133T are partitioned into a data area, into which data from the host operations software (hereinafter, user data) is written, and a control area, into which a type of data that differs from user data is written. The control area is capable of being accessed by the multi-path management software and the integrated management software 403, but incapable of being accessed by the operations software.

As shown by arrow 502, the copy-target redundancy information is written to the control area of the copy-target storage volume 133T by a remote copy between the copy-source storage volume 133S and the copy-target storage volume 133T.

As shown by arrow 503, the copy-target multi-path management software of the copy-target host 105T reads out the copy-target redundancy information from the control area of the copy-target storage volume 133T. The copy-target multi-path management software updates the path status table based on this read-out copy-target redundancy information.

The preceding is an explanation of the second embodiment.

Furthermore, the copy-target CHA port identifier, copy-target pre-update LUN security information, and copy-target post-update LUN security information can also be sent to the copy-target storage system 101T using an inter-volume remote copy. In this case, the CHA can read out the copy-target CHA port identifier, copy-target pre-update LUN security information, and copy-target post-update LUN security information from the copy-target storage volume, and can update the LUN security table based on this read-out information.

Further, the integrated management computer 113 (integrated management software 403) can also write the copy-target redundancy information to the copy-target storage volume mapped to the copy-target redundancy information. The copy-target CHA port identifier, copy-target pre-update LUN security information, and copy-target post-update LUN security information can also be written to any of the copy-target storage volumes from the integrated management computer 113.

Embodiment 3

Figure 15:
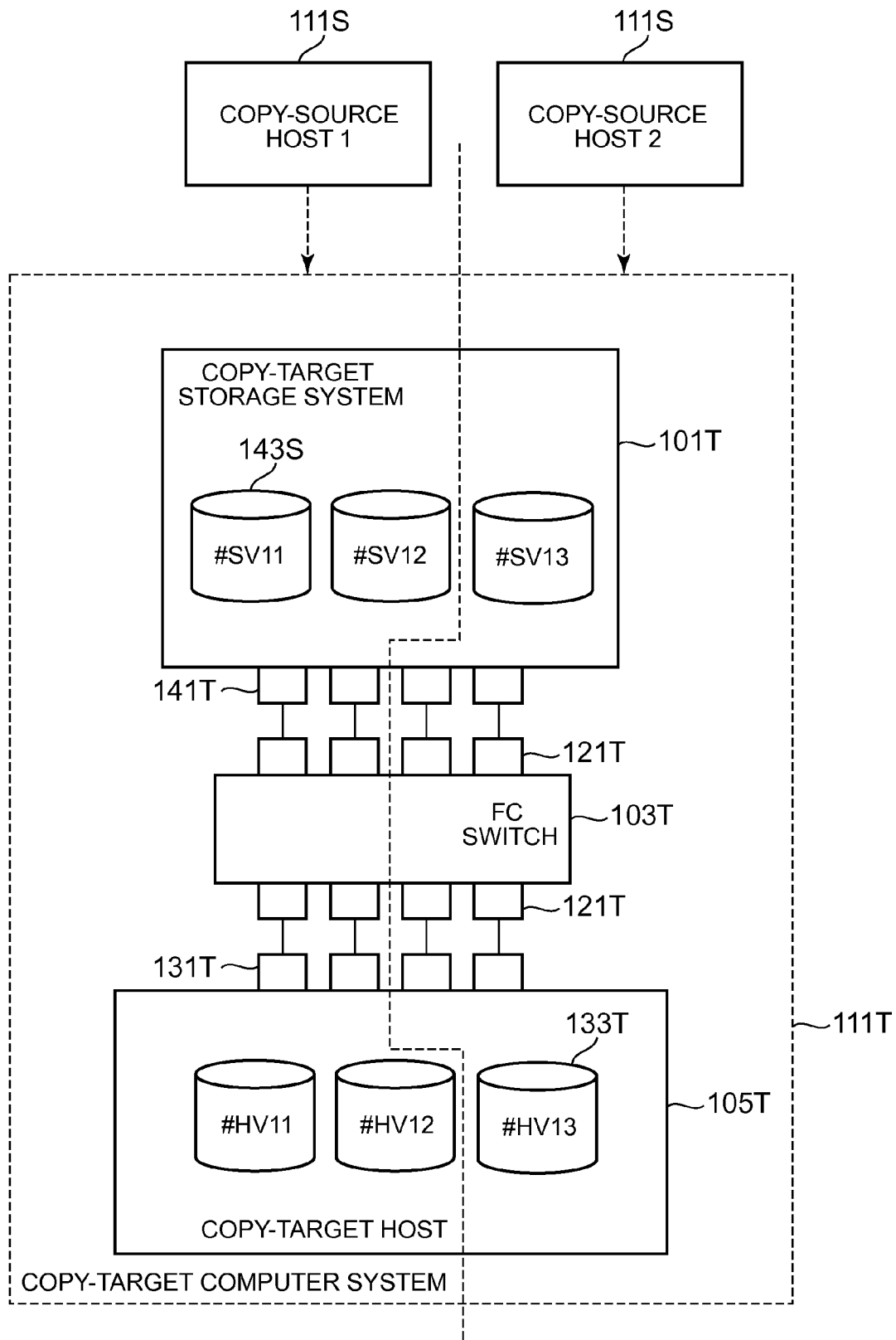
FIG. 15 shows an example of the overall constitution of a system in a third embodiment of the present invention.

FIG. 15 shows an example of the overall constitution of a system related to a third embodiment of the present invention.

There are a plurality of copy-source computer systems 111S for one copy-target computer system 111T. In this case, for example, the copy-target computer system 111T is logically divided into a plurality of copy-target computer sub-systems as shown by the dotted line. One copy-target computer sub-system is mapped to one copy-source computer system 111S. The respective copy-target computer sub-systems have at least one copy-target host volume and at least one copy-target storage volume.

The above-described embodiments of the present invention are example for explaining the present invention, and do not purport to limit the scope of the present invention solely to these embodiments. The present invention can be put into practice in a variety of other modes without departing from the gist thereof.

For example, the processing flow disclosed in at least one figure of FIG. 7 through FIG. 9 and FIG. 11 through FIG. 13 shows an overview of the respective processes to the extent required to understand and implement the present invention. Therefore, a so-called person having ordinary skill in the art will be able to change the order of the steps, and change a step to a different step without departing from the scope of the present invention.

Furthermore, for example, a change in copy-source redundancy is not limited to a manual operation by the user, but rather can also be carried out in accordance with other causes, for example, a change of the LUN security information in the copy target (for example, the deletion of an online and/or offline copy-source path by deleting the identifier of a certain copy-source HBA port (copy-source LUN security information)).

What is claimed is:

1. A computer comprising:
a first-path-redundancy acquisition unit for acquiring first-path-redundancy information, which is information related to the redundancy of a first path linking a first storage volume of a first storage system to a first host volume of a first host;
a redundancy-configuration-destination specification unit for referencing host volume mapping management information, which is information denoting which first host volume of which first host is mapped to which second host volume of which second host, and for specifying the second host volume mapped to the first host volume connected to the redundancy-configured first path;
a second-path-redundancy decision unit for deciding the redundancy of a second path linking the specified second host volume to a second storage volume of a second storage system, based on the acquired first-path-redundancy information; and
an output unit for outputting second-path-redundancy information, which is information related to the redundancy of the decided second path, so that the decided second-path redundancy is configured in the second host having the specified second host volume,
wherein the first-path redundancy is a value based on the number of active first paths, which are active-state first paths of the plurality of first paths connected to the same first host volume and the same first storage volume;
the second-path redundancy is a value based on the number of active second paths, which are active-state second paths of the plurality of second paths connected to the same second host volume and the same second storage volume;
the first storage system and one or more first hosts configure a first computer system;
the first storage volume is a logical volume in the first storage system;
the first host volume is a logical device mapped to the first storage volume recognized by the first host;
the second storage system and one or more second hosts configure a second computer system;

the second storage volume is a logical volume, which is in the second storage system, and which stores data that is stored in the first storage volume; and the second host volume is a logical device mapped to the second storage volume recognized by the second host.

2. The computer according to claim 1, wherein, when the number of first paths for which redundancy has been configured and the number of second paths mapped to the redundancy-configured first paths are the same, the second-path-redundancy decision unit decides a redundancy for the mapped second path that is the same redundancy as the first path redundancy.

3. The computer according to claim 1, wherein, when the number of first paths for which redundancy has been configured $P_s$ and the number of second paths mapped to the redundancy-configured first paths $P_t$ are different, the second-path-redundancy decision unit decides a redundancy, such that the percentage of the number of active second paths for the $P_t$ is as close as possible to the percentage of the number of active first paths for the $P_s$, as the redundancy for the mapped second path.

4. The computer according to claim 1, wherein, when the number of first paths for which redundancy has been configured $P_s$ and the number of second paths mapped to the redundancy-configured first paths $P_t$ are different, the second-path-redundancy decision unit decides the redundancy of the mapped second path based on the number of either active or passive first paths of the configured redundancy.

5. The computer according to claim 1, wherein, when $P_s < P_t$ due to an error having occurred in any of the first paths, the second-path-redundancy decision unit decides the redundancy of the mapped second path such that the number of second paths in the passive state equals the number of error first paths, which are first paths in which errors have occurred.

6. The computer according to claim 1, wherein, when $P_s > P_t$ due to an error having occurred in any of the second paths, the second-path-redundancy decision unit decides the redundancy of the mapped second path such that the number of passive second paths, which are second paths in the passive state, is as close as possible to the number of passive first paths, which are first paths in the passive state, by allocating an active first path for an error second path, which is a second path in which an error has occurred.

7. The computer according to claim 1, wherein the output unit writes the second-path-redundancy information to the first storage volume mapped to the first host volume to which the redundancy-configured first paths are connected.

8. The computer according to claim 1, wherein the first storage system has a plurality of first storage ports and a first access controller, the first storage port is a communication port for receiving an access command from a first host, the first access controller is a first storage port to which has been mapped a first identification information mapped to a first host port, which is either the first host or a communication port thereof, and when an access command is received, the first access controller allows this access command access if this access command is from either the first host or the first host port mapped to the first identification information;

the second storage system has a plurality of second storage ports and a second access controller, the second storage port is a communication port for receiving an access command from a second host, the second access controller is a second storage port to which has been mapped a second identification information mapped to a second host port, which is either the second host or a communication port thereof, and when an access command is received, the second access controller allows this access command access if this access command is from either the second host or the second host port mapped to the second identification information, the computer further comprising:

a first-security-information acquisition unit for acquiring first security information, which is information related to what first identification information is mapped to which first storage port;

an identification information/storage port specification unit for referencing identification mapping management information, which is information denoting which first identification information is mapped to which second identification information, and storage port mapping management information, which is information denoting which first storage port is mapped to which second storage port, and for specifying the second identification information mapped to the first identification information specified from the first security information, and the second storage port mapped to the first storage port specified from the first security information; and a second-security-information output unit for outputting second security information, which is information related to the specified second storage port and the specified second identification information, such that the specified second identification information is mapped to the specified second storage port.

9. The computer according to claim 8, wherein the first security information is information related to which first identification information mapped to which first storage port will change to what first identification information, the identification information/storage port specification unit specifies the pre-change second identification information mapped to the pre-change first identification information specified from the first security information, and the post-change second identification information mapped to the post-change first identification information specified from the first security information, and the second security information comprises the specified pre-change second identification information and post-change second identification information.

10. The computer according to claim 8, wherein the acquired first-path-redundancy information is information related to the post-change redundancy of the first path through the first storage port, which changed as a result of the first identification information being mapped to the first storage port.

11. A path redundancy configuration method, comprising the steps of:

acquiring first-path-redundancy information, which is information related to the redundancy of a first path linking a first storage volume of a first storage system to a first host volume of a first host;

referencing host volume mapping management information, which is information denoting which first host volume of which first host is mapped to which second host volume of which second host, and for specifying the second host volume mapped to the first host volume connected to the redundancy-configured first path;

deciding the redundancy of a second path linking the specified second host volume to a second storage volume of a second storage system, based on the acquired first-path-redundancy information; and outputting second-path-redundancy information, which is information related to the redundancy of the decided second path, so that the decided second-path redundancy is configured in the second host having the specified second host volume, wherein first-path redundancy is a value based on the number of active first paths, which are active-state first paths of the plurality of first paths connected to the same first host volume and the same first storage volume;

second-path redundancy is a value based on the number of active second paths, which are active-state second paths of the plurality of second paths connected to the same second host volume and the same second storage volume;

the first storage system and one or more first hosts configure a first computer system;

the first storage volume is a logical volume in the first storage system;

the first host volume is a logical device mapped to the first storage volume recognized by the first host;

the second storage system and one or more second hosts configure a second computer system;

the second storage volume is a logical volume, which is in the second storage system, and which stores data that is stored in the first storage volume; and the second host volume is a logical device mapped to the second storage volume recognized by the second host.

12. A computer program, comprising:

a program code for acquiring first-path-redundancy information, which is information related to the redundancy of a first path linking a first storage volume of a first storage system to a first host volume of a first host;

a program code for referencing host volume mapping management information, which is information denoting which first host volume of which first host is mapped to which second host volume of which second host, and for specifying the second host volume mapped to the first host volume connected to the redundancy-configured first path;

a program code for deciding the redundancy of a second path linking the specified second host volume to a second storage volume of a second storage system, based on the acquired first-path-redundancy information; and a program code for outputting second-path-redundancy information, which is information related to the redundancy of the decided second path, so that the decided second-path redundancy is configured in the second host having the specified second host volume, wherein first-path redundancy is a value based on the number of active first paths, which are active-state first paths of the plurality of first paths connected to the same first host volume and the same first storage volume;

second-path redundancy is a value based on the number of active second paths, which are active-state second paths of the plurality of second paths connected to the same second host volume and the same second storage volume;

the first storage system and one or more first hosts configure a first computer system;

the first storage volume is a logical volume in the first storage system;

the first host volume is a logical device mapped to the first storage volume recognized by the first host;

the second storage system and one or more second hosts configure a second computer system;

the second storage volume is a logical volume, which is in the second storage system, and which stores data that is stored in the first storage volume; and the second host volume is a logical device mapped to the second storage volume recognized by the second host.

* * * * *